US 8,064,961 B2

(12) United States Patent
Mishima

(10) Patent No.: US 8,064,961 B2
(45) Date of Patent: Nov. 22, 2011

(54) COMMUNICATION SYSTEM AND METHOD THEREFOR

(75) Inventor: Takayuki Mishima, Tokyo (JP)

(73) Assignee: Hewlett-Packard Development Company, L.P., Houston, TX (US)

( * ) Notice: Subject to any disclaimer, the term of this patent is extended or adjusted under 35 U.S.C. 154(b) by 789 days.

(21) Appl. No.: 12/178,914

(22) Filed: Jul. 24, 2008

(65) Prior Publication Data

US 2009/0029701 A1 Jan. 29, 2009

(30) Foreign Application Priority Data

Jul. 26, 2007 (JP) ................................ 2007-194201

(51) Int. Cl.
*H04B 1/38* (2006.01)
*H04W 4/00* (2009.01)
*H04M 3/42* (2006.01)
(52) U.S. Cl. ................. 455/564; 455/432.2; 379/216.01
(58) Field of Classification Search ............... 455/432.2, 455/433, 564, 414.1, 445, 554; 379/40, 51, 379/207.11, 207.13, 207.14, 207.15, 216.01
See application file for complete search history.

(56) References Cited

U.S. PATENT DOCUMENTS

| 6,122,501 | A * | 9/2000 | Gallant ........................ 455/414.1 |
| 6,813,504 | B2 * | 11/2004 | Benchetrit et al. ............ 455/461 |
| 2002/0186832 | A1 * | 12/2002 | Mani ........................ 379/355.01 |

FOREIGN PATENT DOCUMENTS

| CN | 101047912 | 2/2002 |
| EP | 1154363 | 5/2003 |
| JP | 11-074976 | 3/1999 |
| JP | 2003-037671 | 7/2001 |
| JP | 2005-84846 | 3/2005 |
| JP | 2007-124106 | 10/2005 |
| JP | 2006-067130 | 3/2006 |
| JP | 2007-123959 | 5/2007 |

OTHER PUBLICATIONS

Notice of Rejection, Jun. 16, 2009, 4 pages.

* cited by examiner

*Primary Examiner* — George Eng
*Assistant Examiner* — Nam Huynh

(57) ABSTRACT

To effectively prevent information leakage from a communication node, such as a cellular phone. Not an actual communication-destination telephone number, but a telephone number code which is arbitrarily assigned corresponding to the actual communication-destination telephone number, and information required for telephone number selection are registered in an address book of a cellular phone 2. An actual telephone number of each cellular phone 2, a telephone number code of a communication destination thereof, and information of the communication destination are registered in an address book of an address management server 4 in association with one another. When a communication-source cellular phone 2 makes a call to a communication-destination cellular phone 2, the actual communication-source telephone number and the communication-destination telephone number code are sent from the communication source to the address management server 4, and a communication-destination telephone number is searched for to obtain the actual communication-destination telephone number. The obtained telephone number is used to connect a call path between the communication source and the communication destination.

10 Claims, 17 Drawing Sheets

CELLULAR PHONE SYSTEM 1

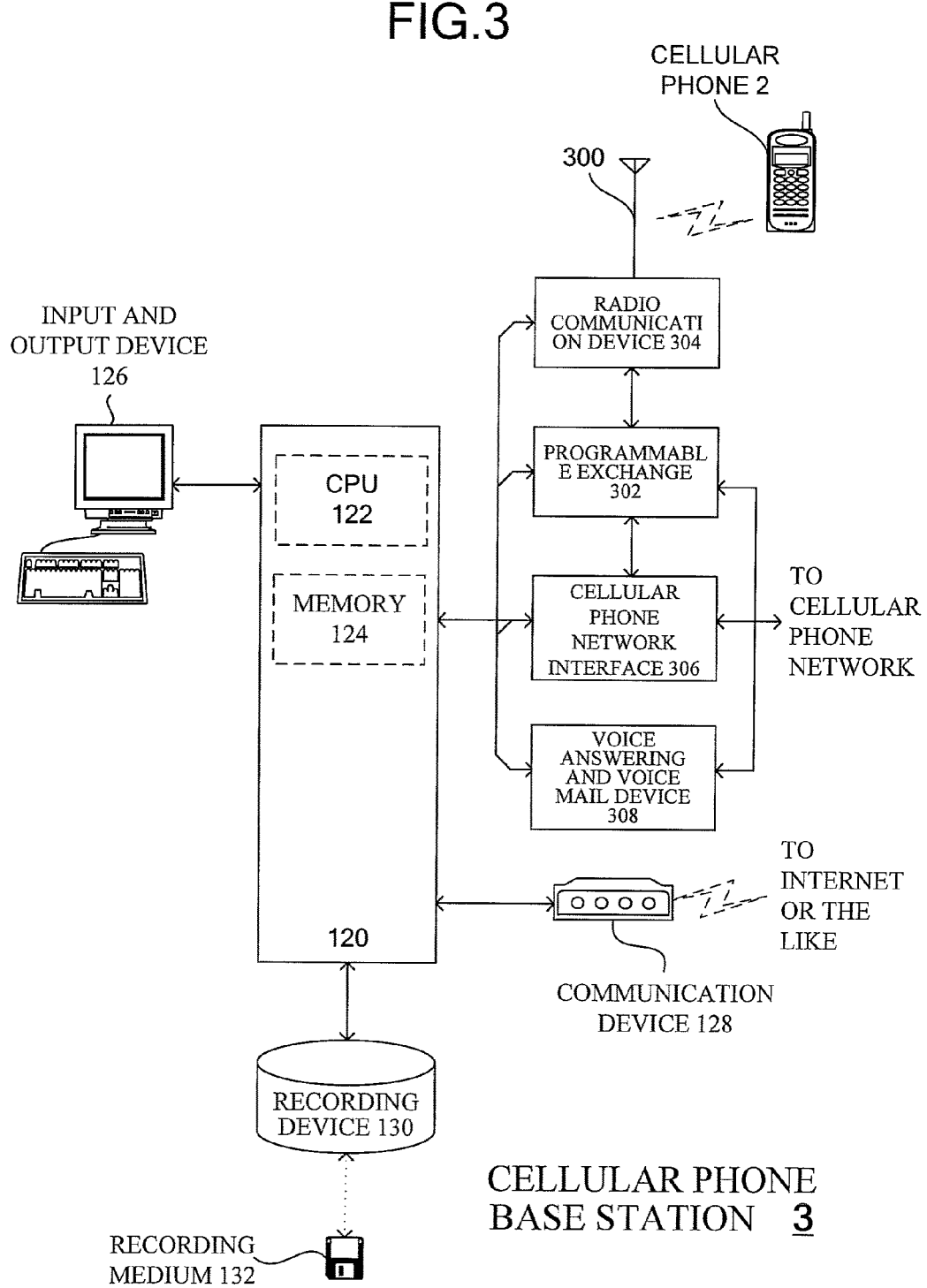

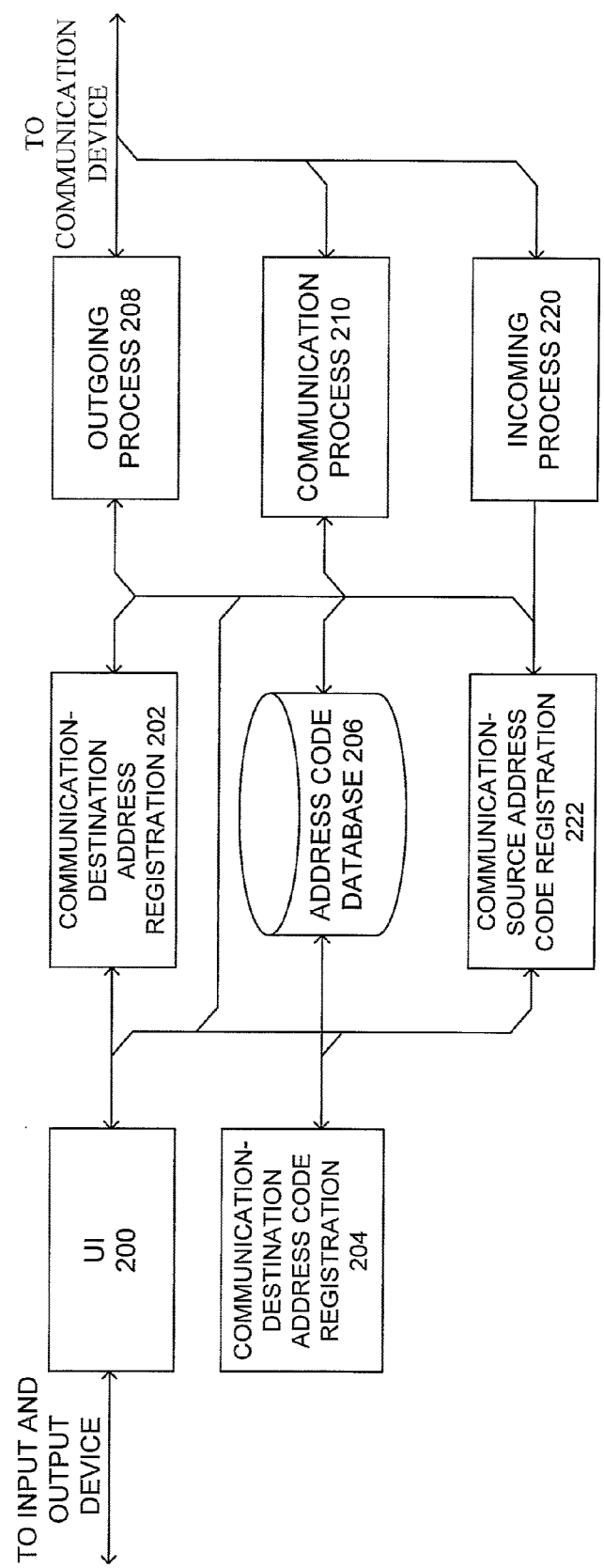

FIG.5A

| | |
|---|---|
| ⋮<br>A-B-100<br>⋮ | ⋮<br>INFORMATION OF Y<br>⋮ |

FIG.5B

| | |
|---|---|
| ⋮<br>100@D<br>⋮ | ⋮<br>INFORMATION OF Y<br>⋮ |

FIG.6A

| A-B-200 | INFORMATION OF X |
|---|---|

FIG.6B

| 200@E | INFORMATION OF X |
|---|---|

FIG.7A

| TELEPHONE NUMBER X' | | | EMAIL ADDRESS X" | | |
|---|---|---|---|---|---|
| . . . A-B-100 . . . | . . . Y' . . . | INFORMATION OF Y | . . . 100@D . . . | . . . Y" . . . | INFORMATION OF Y |

FIG.7B

| TELEPHONE NUMBER Y' | | | EMAIL ADDRESS Y" | | |
|---|---|---|---|---|---|
| . . . A-B-200 . . . | . . . X' . . . | INFORMATION OF X | . . . 200@E . . . | . . . X" . . . | INFORMATION OF X |

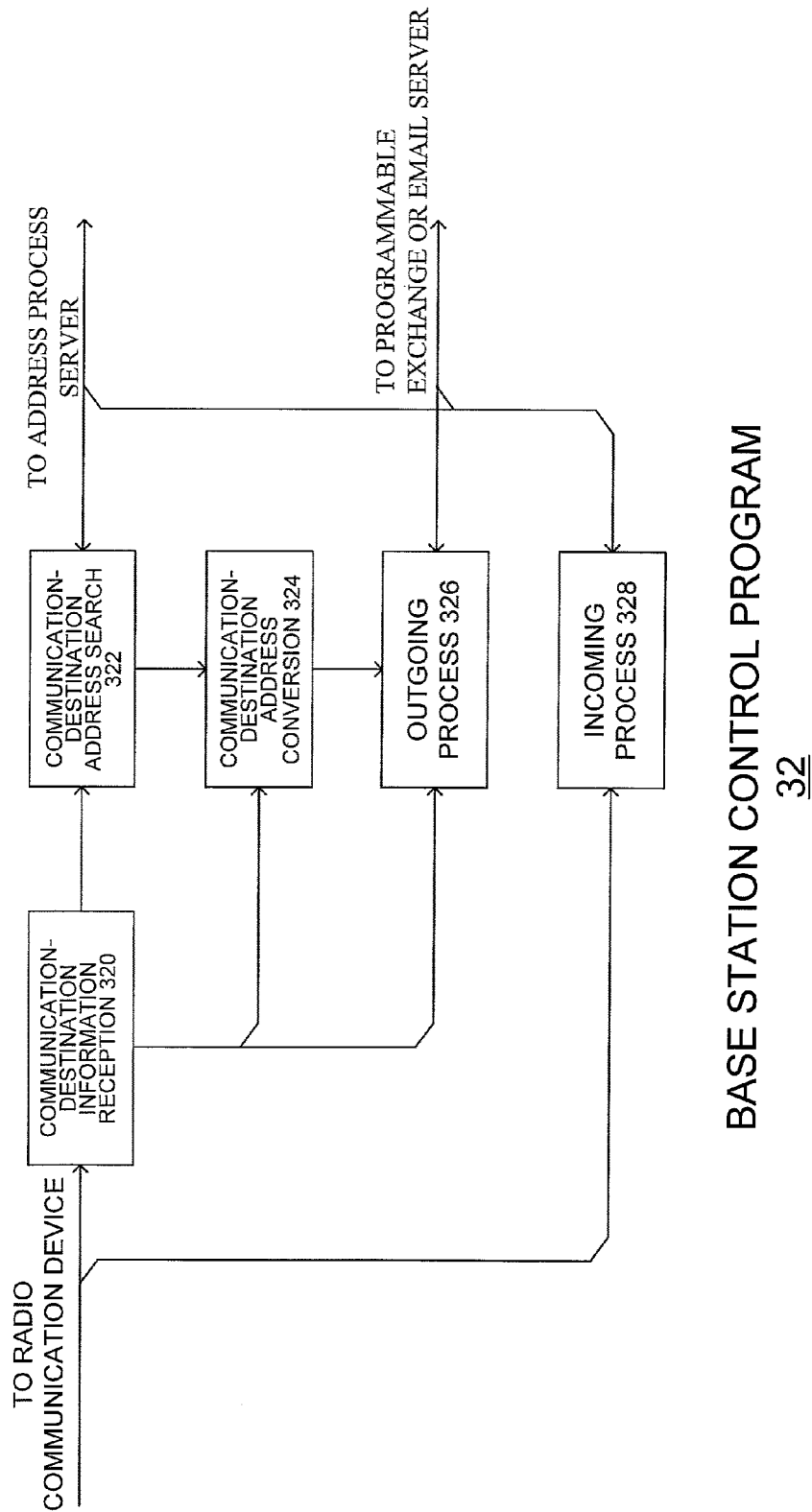

COMMUNICATION SYSTEM AND METHOD THEREFOR

PRIORITY CLAIM

The present invention claims priority under 35 U.S.C. 119 to Japanese Patent Application Serial No. JP2007-194201, filed on Jul. 26, 2007, the disclosure of which is hereby incorporated by reference in its entirety.

TECHNICAL FIELD

The present invention relates to a communication system realizing communications with the use of telephones and email addresses and a method therefor.

BACKGROUND

For example, Patent Document 1 discloses a method of preventing unauthorized use of a stolen or lost cellular phone, by using an IC card.

Further, for example, Patent Document 2 discloses a method of preventing information leakage from a cellular phone by using a password.

Furthermore, for example, Patent Document 3 discloses a method of managing address book information by using a server connected to a network, instead of using a cellular phone.

[Patent Document 1] JP 2005-84846 A
[Patent Document 2] JP 2006-67130 A
[Patent Document 3] JP 2007-123959 A

PROBLEM TO BE SOLVED BY THE INVENTION

The present invention has been made in view of the above-mentioned background, and therefore has an object to provide a communication system improved such that information leakage from a communication node such as a cellular phone can be effectively prevented and a method therefor.

MEANS FOR SOLVING THE PROBLEM

In order to achieve the above-mentioned object, the present invention provides a communication system including: a plurality of communication nodes to each of which a unique address is assigned; and a communication device, in which: each of the plurality of communication nodes includes: address registration means for registering a communication-destination address of the communication-destination communication node and a communication-destination address code corresponding to the communication-destination address, in the communication device; first storage means for storing at least the communication-destination address code registered in the communication device; and communication request means for requesting, when the stored communication-destination address code is selected, the communication device to perform communication with the communication-destination communication node by using the unique address used as a communication-source address of the communication-source communication node, and the selected communication-destination address code; and the communication device includes: second storage means for storing the registered communication-destination address and the registered communication-destination address code in association with an address of the communication-source communication node which has registered the communication-destination address and the communication-destination address code; search means for searching the second storage means when communication is requested by the communication-source communication node, to obtain the communication-destination address corresponding to the communication-source address and to the communication-destination address code, as a search result; communication means for allowing the communication between the communication-source communication node and the communication-destination communication node by using the communication-destination address obtained through the search, and notifying the communication-source address code to the communication-destination communication node; and address code generation means for generating the communication-source address code corresponding to the communication-source address when it is found through the search that the communication-source address code has not been stored in the second storage means in association with the communication-destination address.

EFFECT OF THE INVENTION

According to the communication system and the method therefor of the present invention, information leakage from a communication node such as a cellular phone can be effectively prevented.

BRIEF DESCRIPTION OF THE DRAWINGS

FIG. 3 is a diagram showing a hardware configuration of a base station shown in FIG. 1.

FIG. 4 is a diagram showing a configuration of a telephone control program executed in the cellular phone of the cellular phone system shown in FIG. 1.

FIGS. 5A and 5B are diagrams showing communication-destination address codes and communication-destination information which are stored in an address code database shown in FIG. 4, in which part (A) shows a communication-destination telephone number code and communication-destination information corresponding to the telephone number code, and part (B) shows a communication-destination email address code and communication-destination information corresponding to the email address code.

FIGS. 6A and 6B are diagrams showing communication-source address codes and communication-source information which are stored in the address code database shown in FIG. 4, in which part (A) shows a communication-source telephone number code and communication-source information corresponding to the telephone number code, and part (B) shows a communication-source email address code and communication-source information corresponding to the email address code.

FIGS. 7A and 7B are diagrams showing address codes, addresses, and information of cellular phones, which are registered in the address management server shown in FIG. 1, in which part (A) shows the address code of a user Y, the address (Y', Y") thereof, and the information of the cellular phone thereof, which are registered in the address management server from the cellular phone of a user X, and part (B) shows the address code of the cellular phone of the user X, the address (X', X") thereof, and the information of the cellular phone, which are registered in the address management server 4 from the cellular phone of the user Y.

FIG. 8 is a diagram showing a configuration of a base station control program executed in the base station of the cellular phone system shown in FIG. 1.

BEST MODE FOR CARRYING OUT THE INVENTION

Cellular Phone System 1

Hereinafter, an embodiment of the present invention will be described.

Figure 1:
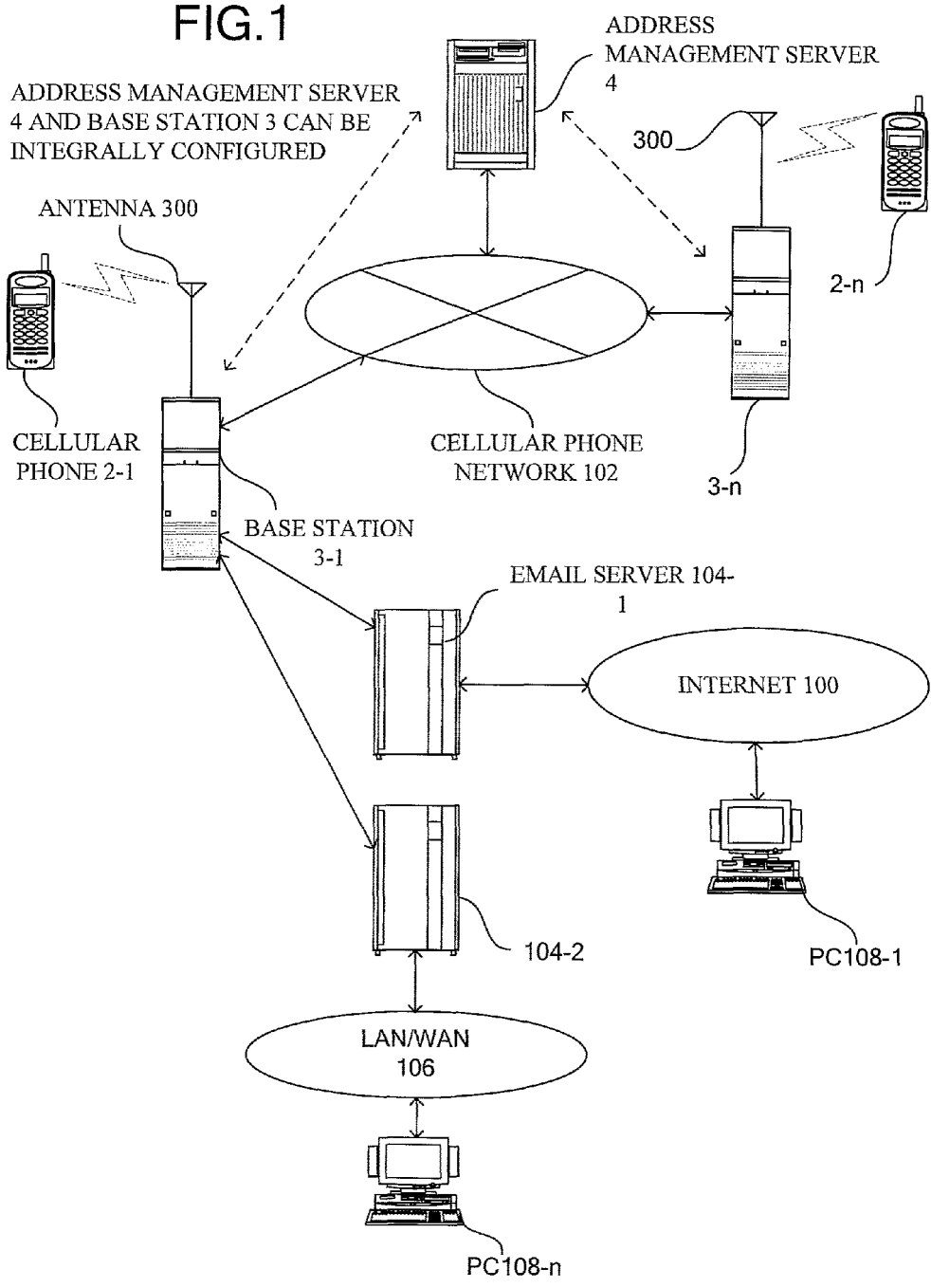
FIG. 1 is a-diagram showing a configuration of a cellular phone system to which an address management method according to the present invention is applied.

FIG. 1 is a diagram showing a configuration of a cellular phone system 1 to which an address management method according to the present invention is applied.

Note that the address management method according to the present invention can be applied not only to wireless communication systems such as cellular phone systems but also to wired communication systems such as fixed telephones. In order to give a specific and clear description, a case where the address management method according to the present invention is applied to the cellular phone system is taken as a specific example.

As shown in FIG. 1, the cellular phone system 1 includes base stations 3-1 to 3-n connected to a cellular phone network 102, cellular phones 2-1 to 2-n (communication nodes) connected to the base stations 3 (communication devices) via radio communication channels, email servers 104-1 to 104-n connected to the base station 3-1, the Internet 100 connected to the email server 104-1, and a local area network (LAN) or wide area network (WAN) 106 connected to the email server 104-2, a computer (PC) 108-1 (communication node) connected to the Internet 100, a PC 108-n connected to the LAN/WAN 106 (n is equal to or larger than 2 for the cellular phones 2, n is equal to or larger than 1 for the other components, and FIG. 1 shows an example case where n is equal to 2), and an address management server 4 (address management device) connected to the cellular phone network 102.

Note that, hereinafter, when any of the components whose total count can be two or more, such as "the base stations 3-1 to 3-n", is indicated without specifying it, it is simply referred to as "the base station 3", for example.

The number of components of each type included in the cellular phone system 1 of FIG. 1 is shown as an example. The base station 3 and the address management server 4 can be separately configured or integrally configured depending on the intended purpose or the configuration of the cellular phone system 1. In the accompanying drawings, identical reference symbols are assigned to substantially identical components and processes.

The email server 104, the PC 108, the cellular phone 2, the base station 3, and the address management server 4 may be collectively referred to as "nodes". In particular, the cellular phone 2 and the PC 108 may be collectively referred to as "communication nodes". The telephone number and the email address of each cellular phone 2 may be collectively referred to as "address".

When a cellular phone 2-i makes a call or sends email to a cellular phone 2-j, the cellular phone 2-i serves as a communication-source cellular phone and the cellular phone 2-j serves as a communication-destination cellular phone (for the cellular phones 2, n is equal to or larger than i, j is equal to or larger than 1, and i is not equal to j). In other words, the cellular phone 2 can be either a communication-source cellular phone or a communication-destination cellular phone. Hereinafter, in order to give a specific and clear description, a case where a cellular phone 2 of a user X serves as a communication source and another cellular phone 2 of a user Y serves as a communication destination is taken as a specific example (X is different from Y).

In the cellular phone system 1, email communication can be performed between the cellular phone 2 and the PC 108 and between the cellular phones 2 (email communication can be performed between any communication nodes). Hereinafter, in order to give a specific and clear description, email communication performed between the cellular phones 2 is taken as a specific example.

The cellular phone system 1 implements, with the above-mentioned components, an address book function by making the cellular phone 2 store not an actual address of a communication destination but only a code (address code such as telephone number code and email address code) indicating the address of the communication destination. As a result, leakage of personal information such as addresses, which may occur when the cellular phone 2 is lost, is effectively prevented.

Hardware Configuration

Hereinafter, a hardware configuration of the components included in the cellular phone system 1 will be described.

Figure 2:
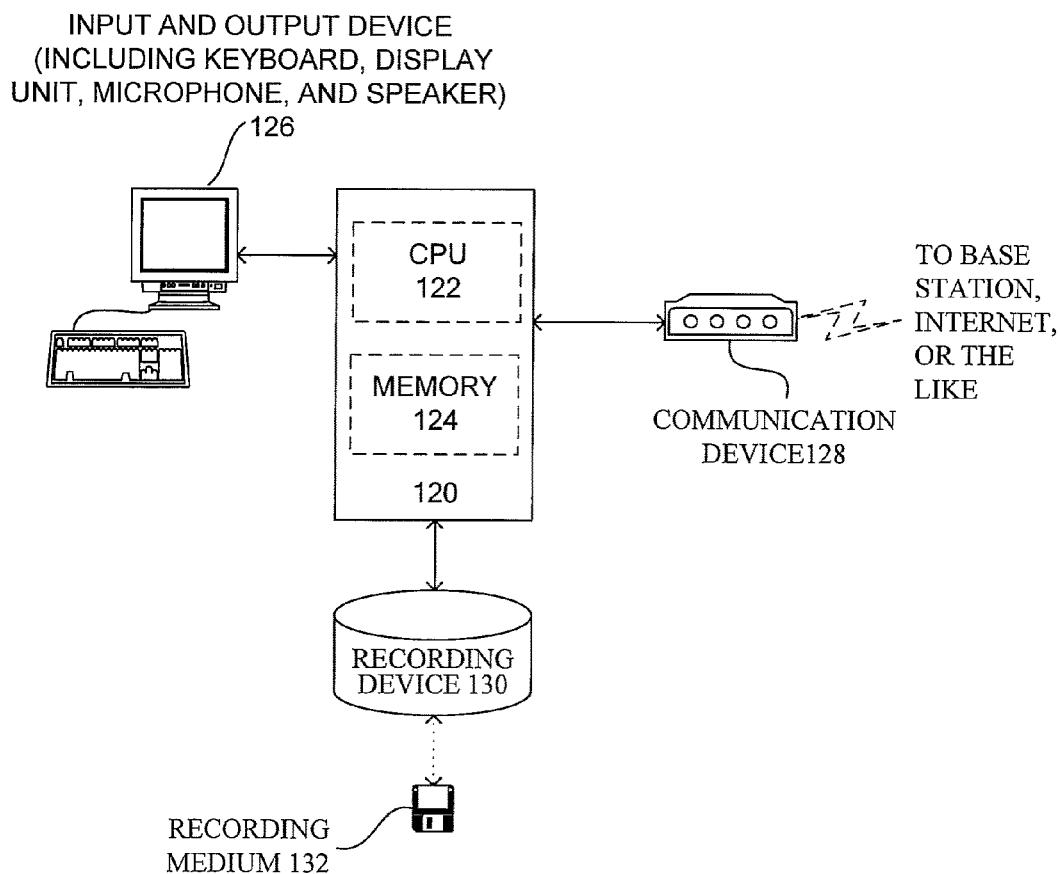
FIG. 2 is a diagram showing a hardware configuration of an email server, a personal computer, a cellular phone, and an address management server shown in FIG. 1.

FIG. 2 is a diagram showing a hardware configuration of the email server 104, the PC 108, the cellular phone 2, and the address management server 4 shown in FIG. 1. As shown in FIG. 2, the above-mentioned components of the cellular phone system 1 include a main body 120 which includes a CPU 122, a memory 124, and the like, an input and output device 126 which includes a keyboard, a display unit, and the like, a communication device 128 which performs communication with other nodes via the Internet 100 or the like, and a recording device 130, such as a CD device and an HDD, which records and reproduces data in a recording medium 132 such as a CD and an HD.

Note that the main body 120, the input and output device 126, and the communication device 128 are not separately provided but integrally configured in the cellular phone 2, as it is generally known. In the input and output device 126 of the cellular phone 2, a microphone and a speaker used for calls are further included, and, instead of the keyboard, numeric keypad, and the like, are properly used as an input device suitable for the cellular phone.

Further, an antenna 300 (not shown in FIG. 2, see FIG. 1 etc.) is provided for the base station 3 to perform communication via radio communication channels. In other words, the above-mentioned components of the cellular phone system 1 include the components collectively serving as a computer capable of communicating with other nodes.

FIG. 3 is a diagram showing a hardware configuration of the base station 3 shown in FIG. 1.

As shown in FIG. 3, the base station 3 includes, in addition to the components included in the email server 104 and the like shown in FIG. 2, a radio communication device 304 which performs communication with the cellular phone 2 via the antenna 300 and radio communication channels, a programmable exchange 302 which connects the cellular phones 2 for calls through circuit switching, a cellular phone network interface (IF) 306 which connects the cellular phone network 102 to the programmable exchange 302, and a voice answering and voice mail (VM) device 308.

In other words, the base station 3 has the components collectively serving as a computer capable of communicating with other nodes and the components collectively implementing functions (such as a circuit switching function, a voice answering function, and a voice mail function) required to serve as the base station 3 in the cellular phone system 1.

Software

Hereinafter, software to be executed in the components of the cellular phone system 1 will be described.

FIG. 4 is a diagram showing a configuration of a telephone control program 20 executed in the cellular phone 2 of the cellular phone system 1 shown in FIG. 1.

As shown in FIG. 4, the telephone control program 20 includes a user interface module (UI module) 200, a communication-destination address registration module 202, a communication-destination address code registration module 204 (address registration means), an address code database (DB) 206 (first storage means), an outgoing process module 208 (communication request means), a communication process module 210, an incoming process module 220, and a communication-source address code registration module 222.

Note that, in FIG. 4, components which are included in the telephone control program 20 but are not directly related to the description of the present invention are omitted (the same applies to programs to be described below).

The telephone control program 20 is supplied to the cellular phone 2, for example, via the recording medium 132 or a non-volatile memory included in the memory 124; loaded into the memory 124; and executed by an OS operating in the cellular phone 2 by using a specific hardware resource of the cellular phone 2 (the same applies to the programs to be described below).

The telephone control program 20 implements, with the above-mentioned components, a call function and an email communication function to serve as a typical cellular phone. However, the telephone control program 20 can implement an address book function used to select a telephone number or an email address when making a call or sending email, by storing not an actual telephone number or email address of the communication-destination cellular phone 2 but only a telephone number code and email address code corresponding to the actual telephone number and email address, and information of the communication-source telephone number (such as the name of the user of the communication-source cellular phone 2).

FIGS. 5A and 5B are diagrams showing communication-destination address codes and communication-destination information which are stored in the address code DB 206 shown in FIG. 4, in which part (A) shows a communication-destination telephone number code and communication-destination information corresponding to the telephone number code, and part (B) shows a communication-destination email address code and communication-destination information corresponding to the email address code.

FIGS. 6A and 6B are diagrams showing communication-source address codes and communication-source information which are stored in the address code DB 206 shown in FIG. 4, in which part (A) shows a communication-source telephone number code and communication-source information corresponding to the telephone number code, and part (B) shows a communication-source email address code and communication-source information corresponding to the email address code.

Note that the address codes of the communication-destination cellular phone 2 and the information of the communication-destination cellular phone 2, which are associated with each other as shown in parts (A) and (B) of FIGS. 5A and 5B and parts (A) and (B) of FIGS. 6A and 6B, are included in a so-called address book at the side of the cellular phone 2.

The UI module 200 of the telephone control program 20 receives an operation applied to the input and output device 126 of the cellular phone 2, sends information indicating the received operation to the respective components included in the telephone control program 20, and controls processing of the components. Further, the UI module 200 displays the address code (telephone number code and email address code) of the communication-destination cellular phone 2 and the information of the communication-destination cellular phone 2 corresponding to the address code, which are shown in parts (A) and (B) of FIGS. 5A and 5B, on the input and output device 126, and receives a selection operation applied to the displayed items.

Further, the UI module 200 displays, on the display unit of the input and output device 126 of the cellular phone 2, a UI image used to register the address code and the communication-source information corresponding to the address code, which are shown in parts (A) and (B) of FIGS. 5A and 5B, in the address code DB 206, and receives a registration operation.

Further, the UI module 200 displays the address code of the communication-destination cellular phone 2 and the information of the communication-destination cellular phone 2 corresponding to the address code, which are shown in parts (A) and (B) of FIGS. 6A and 6B, on the input and output device 126, and receives a selection operation applied to the displayed items.

Further, the UI module 200 displays, on the display unit of the input and output device 126 of the cellular phone 2, a UI image used to register the address code and the communication-source information corresponding to the address code, which are shown in parts (A) and (B) of FIGS. 6A and 6B, in the address code DB 206, and receives a registration operation.

The outgoing process module 208 of the telephone control program 20 executed in the cellular phone 2 of the communication-source user X performs an outgoing process for a call to and email communication with the cellular phone 2 of the communication-destination user Y via the base station 3. For example, the outgoing process module 208 sends, to the base station 3, a communication request which includes the address code of the cellular phone 2 of the communication-destination user Y selected according to the operation, which has been applied to the input and output device 126 and received by the UI module 200, and the address (parts (A) and (B) of FIGS. 5A and 5B) assigned to the cellular phone 2 of the communication-source user X.

Further, after the outgoing process, the outgoing process module 208 of the telephone control program 20 executed in the cellular phone 2 of the communication-source user X performs a process for the call to and the email communication with the communication-destination cellular phone 2 via the base station 3.

The incoming process module 220 of the telephone control program 20 executed in the cellular phone 2 of the communication-destination user Y performs, in response to an operation applied to the input and output device 126 and received by the UI module 200, an incoming process for the call and the email communication made by the cellular phone 2 of the communication-source user X to and with the cellular phone 2 of the communication-destination user Y via the base station 3.

Further, after the incoming process, the incoming process module 220 of the telephone control program 20 executed in the cellular phone 2 of the communication-destination user Y performs a process for the call from and the email communication with the communication-source cellular phone 2 via the base station 3.

The communication process 210 performs a process to perform communication with the address management server 4 via the base station 3.

The communication-destination address code registration module 204 registers, in response to an operation received by the UI module 200, a telephone number code (A-B-100) which indicates the telephone number of the cellular phone 2 of the communication-destination user Y and is to be selected to make a call, and information (such as the name and a mailing address of the user Y) of the cellular phone 2 of the communication-destination user Y in the address code DB 206 in association with each other as shown in part (A) of FIGS. 5A and 5B.

Further, the communication-destination address code registration module 204 registers, in response to an operation received by the UI module 200, an email address code (100@D) which indicates the email address of the cellular phone 2 of the communication-destination user Y and is to be selected to send email, and information of the cellular phone 2 of the communication-destination user Y in the address code DB 206 in association with each other as shown in part (B) of FIGS. 5A and 5B.

However, in the registration in the address code DB 206, identical information of the cellular phone 2 can also be registered in association with both the telephone number and the email address (hereinafter, the same applies to information of the cellular phone 2).

In the telephone number code (A-B-100) registered by the communication-destination address code registration module 204, "A" is a number used to select a telephone company, for example, "B" is a number indicating the use of an address book, and "100" is an arbitrary number assigned to each communication-destination cellular phone 2, such as a speed dial number. The telephone number code (A-B-100) is different from an actual telephone number (Y') of the communication-destination cellular phone 2 ("A-B-100" is not equal to "Y'").

In the email address code (100@D) registered by the communication-destination address code registration module 204, "100" is an arbitrary number assigned to each communication-destination cellular phone 2 and "@D" is, for example, the domain name of an Internet provider to which the user X subscribes. The email address code (100@D) is different from an actual email address (Y") of the communication-destination cellular phone 2 ("100@D" is not equal to "Y'").

The communication-source address code registration module 222 registers, in response to an operation received by the UI module 200, a telephone number code (A-B-200) which indicates the telephone number of the cellular phone 2 of the communication-source user X and is notified from the address management server 4 via the base station 3, and information (such as the name and a mailing address of the user X) of the communication-source cellular phone 2 in the address code DB 206 in association with each other as shown in part (A) of FIGS. 6A and 6B.

Further, the communication-source address code registration module 222 registers, in response to an operation received by the UI module 200, an email address code (200@E) which indicates the email address of the cellular phone 2 of the communication-source user X and is notified from the address management server 4 via the base station 3, and information of the cellular phone 2 of the communication-source user X in the address code DB 206 in association with each other as shown in part (B) of FIGS. 6A and 6B.

As described above, in the telephone number code (A-B-200) registered by the communication-source address code registration module 222, "A" is a number used to select a telephone company, for example, "B" is a number indicating the use of an address book, and "200" is an arbitrary number assigned to each communication-destination cellular phone 2. The telephone number code (A-B-200) is different from an actual telephone number (X') of the communication-source cellular phone 2 ("A-B-200" is not equal to "X'").

Further, as described above, in the email address code (200@E), "200" is an arbitrary number assigned to each communication-destination cellular phone 2 and "@E" is, for example, the domain name of an Internet provider to which the user X subscribes. The email address code (200@E) is different from an actual email address (X") of the communication-destination cellular phone 2 ("200@E" is not equal to "X'").

FIGS. 7A and 7B are diagrams showing the address codes, the addresses, and the information of the cellular phones 2, which are registered in the address management server 4 shown in FIG. 1, in which part (A) shows the address code of the user Y, the address (Y', Y") thereof, and the information of the cellular phone 2, which are registered in the address management server 4 from the cellular phone 2 of the user X, and part (B) shows the address code of the cellular phone 2 of the user X, the address (X', X") thereof, and the information of the cellular phone 2, which are registered in the address management server 4 from the cellular phone 2 of the user Y.

Note that those pieces of information associated with one another as shown in parts of (A) and (B) of FIGS. 7A and 7B are included in a so-called address book in the address management server 4, in the same way as the information shown in parts (A) and (B) of FIGS. 5A and 5B and parts (A) and (B) of FIGS. 6A and 6B.

The communication-destination address registration module 202 of the telephone control program 20 executed in the cellular phone 2 of the communication-source user X sends, in response to an operation of the user applied to the UI module 200, the telephone number code (A-B-100) of the cellular phone 2 of the communication-destination user Y, the actual telephone number Y' thereof, and information related to the telephone number Y' among the information of the cellular phone 2 of the user Y, to the address management server 4 via the communication process module 210, and requests the address management server 4 to register them, as shown in part (A) of FIGS. 7A and 7B.

Similarly, the communication-destination address registration module 202 of the telephone control program 20 executed in the cellular phone 2 of the communication-source user X sends, in response to an operation of the user applied to the UI module 200, the email address code (100@D) of the cellular phone 2 of the communication-destination user Y, the actual email address Y" thereof, and information related to the email address Y" among the information of the cellular phone 2 of the user Y, to the address management server 4 via the communication process module 210, and requests the address management server 4 to register them, as shown in part (A) of FIGS. 7A and 7B.

The communication-destination address registration module 202 of the telephone control program 20 executed in the cellular phone 2 of the communication-destination user Y sends, in response to an operation of the user applied to the UI module 200, the telephone number code (A-B-200) of the cellular phone 2 of the communication-source user X, the actual telephone number X' thereof, and information related to the telephone number X' among the information of the cellular phone 2 of the user X, to the address management server 4 via the communication process module 210, and requests the address management server 4 to register them, as shown in part (B) of FIGS. 7A and 7B.

Similarly, the communication-destination address registration module 202 of the telephone control program 20 executed in the cellular phone 2 of the communication-destination user Y sends, in response to an operation of the user applied to the UI module 200, the email address code (200@E) of the cellular phone 2 of the communication-source user X, the actual email address X" thereof, and information related to the email address X" among the information of the cellular phone 2 of the user X, to the address management server 4 via the communication process module 210, and requests the address management server 4 to register them, as shown in part (B) of FIGS. 7A and 7B.

FIG. 8 is a diagram showing a configuration of a base station control program 32 executed in the base station 3 of the cellular phone system 1 shown in FIG. 1.

Figure 9:
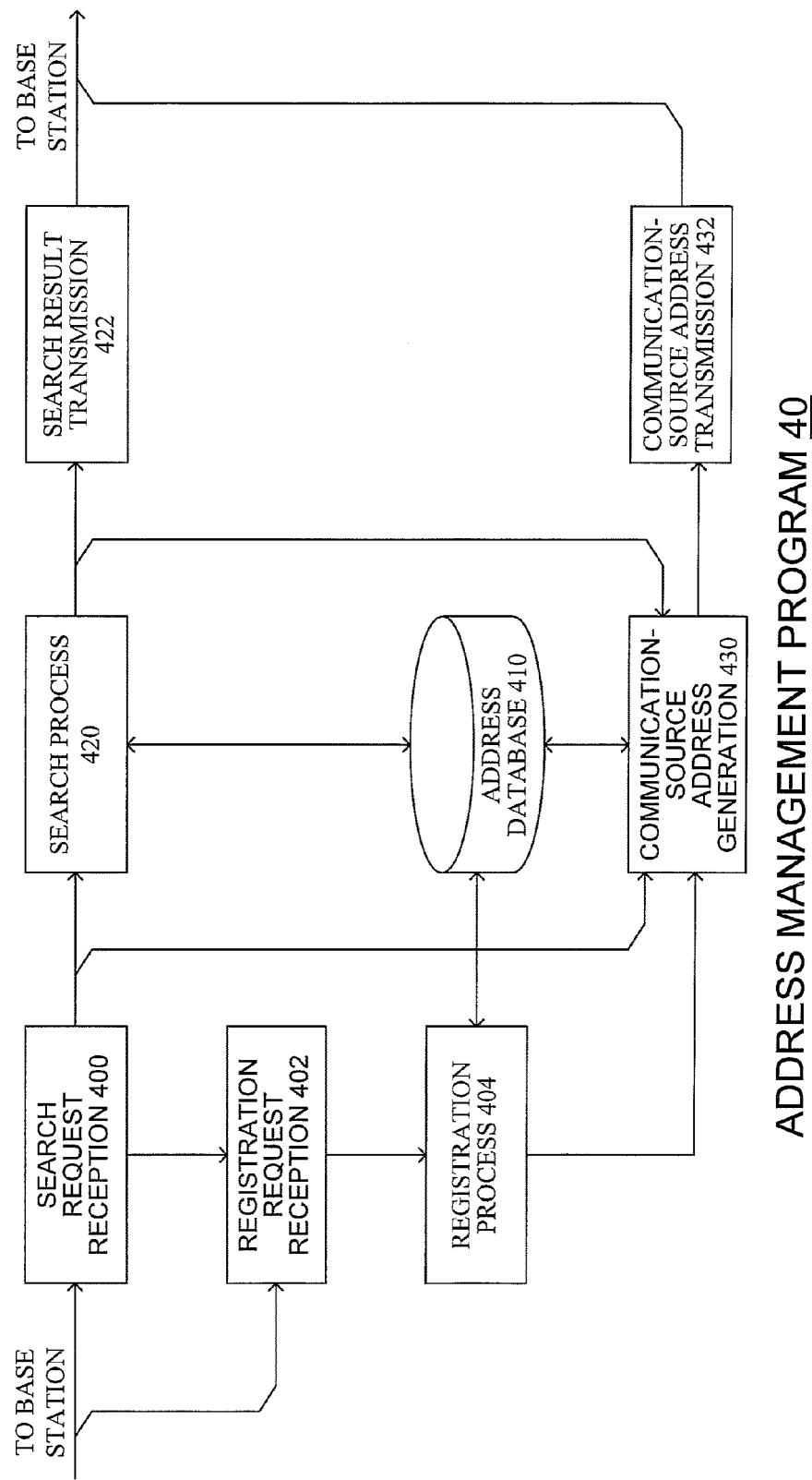
FIG. 9 is a diagram showing a configuration of an address management program executed in the address management server of the cellular phone system shown in FIG. 1.

FIG. 9 is a diagram showing a configuration of an address management program 40 executed in the address management server 4 of the cellular phone system 1 shown in FIG. 1.

As shown in FIG. 8, the base station control program 32 includes a communication-destination information reception module 320, a communication-destination address search module 322, a communication-destination address conversion module 324, an outgoing process module 326 (communication means), and an incoming process module 328.

As shown in FIG. 9, the address management program 40 includes a search request reception module 400, a registration request reception module 402, a registration process module 404, an address DB 410 (second storage means), a search process module 420 (search means), a search result transmission module 422, a communication-source address code generation module 430 (address code generation means), and a communication-source address transmission module 432.

Note that, when the base station 3 and the address management server 4 are integrally configured, the base station control program 32 and the address management program 40 are also integrally configured after an unnecessary part therein is omitted when needed.

The base station control program 32 and the address management program 40 provide, through the above-mentioned components, calls and email communications to be made between typical cellular phones 2.

The address management program 40 provides the address book function for the cellular phone 2. Further, when the address of the communication-source cellular phone 2 has not been registered in an address book used for the communication-destination cellular phone 2, the address management program 40 automatically generates an address code of the communication-source cellular phone 2 and registers the generated address code in association with the actual address of the communication-source cellular phone 2 and with information thereof.

The communication-destination information reception module 320 of the base station control program 32 (FIG. 8) receives a communication request from the cellular phone 2 (the outgoing process module 208 of the telephone control program 20 shown in FIG. 4) via the base station 3, and sends the communication request to the outgoing process module 326.

Further, the communication-destination information reception module 320 sends the address (X', X") of the cellular phone 2 of the communication-source user X and the address code (A-B-100, 100@D) of the cellular phone 2 of the communication-destination user Y, which are included in the communication request, to the communication-destination address search module 322 and the communication-destination address conversion module 324.

The communication-destination address search module 322 sends the address of the cellular phone 2 of the communication-source user X and the address code of the cellular phone 2 of the communication-destination user Y, which are received from the communication-destination information reception module 320, to the address management server 4 to request the address management server 4 to search for the address of the cellular phone 2 of the communication-destination user Y.

Further, the communication-destination address search module 322 sends the address (Y', Y") of the cellular phone 2 of the communication-destination user Y returned from the address management server 4 as a result of the search, to the communication-destination address conversion module 324.

The communication-destination address conversion module 324 converts the address code (A-B-100, 100@D) of the cellular phone 2 of the communication-destination user Y, received from the communication-destination information reception module 320, into the address (Y', Y") of the cellular phone 2 of the communication-destination user Y received from the communication-destination address search module 322, and sends the address (Y', Y") to the outgoing process module 326.

The outgoing process module 326 controls the programmable exchange 302 (FIG. 3) by using the communication request received from the communication-destination information reception module 320 and the address (telephone number Y') of the cellular phone 2 of the communication-destination user Y received from the communication-destination address conversion module 324, to perform an outgoing process for a call to be made between the cellular phone 2 of the user X and the cellular phone 2 of the user Y.

Further, the outgoing process module 326 sends the communication request received from the communication-destination information reception module 320 and the address (email address Y") of the cellular phone 2 of the communication-destination user Y received from the communication-destination address conversion module 324 to the email server 104 (FIG. 1) to perform an outgoing process for email communication to be made between the cellular phone 2 of the user X and the cellular phone 2 of the user Y.

When a communication is requested by the cellular phone 2 of the communication-source user X to the cellular phone 2 of the communication-destination user Y via the programmable exchange 302 (FIG. 3) or via the email server 104 (FIG. 1), the incoming process module 328 performs an incoming process to make the cellular phone 2 of the communication-destination user Y receive the communication from the cellular phone 2 of the communication-source user X.

Note that, at the time of the incoming process for making the cellular phone 2 of the communication-destination user Y receive the communication from the cellular phone 2 of the communication-source user X, the incoming process module 328 sends the address code (A-B-200, 200@E) of the communication-source user X and the information of the communication-source user X, received from the address management server 4, to the cellular phone 2 of the communication-destination user Y (part (B) of FIGS. 7A and 7B).

In response to a registration request received from the cellular phone 2 (the communication-destination address registration module 202 of the telephone control program 20 shown in FIG. 4) of the communication-source user X via the base station 3, the registration request reception module 402 of the address management program 40 (FIG. 9) receives, from the cellular phone 2 of the communication-source user X, the address (Y', Y") of the cellular phone 2 of the communication-destination user Y, the address code (A-B-1 00, 100@D) thereof, and the information of the cellular phone 2 of the communication-destination user Y (part (A) of FIGS. 7A and 7B), and sends them to the registration process module 404.

The registration process module 404 registers the pieces of information received from the registration request reception module 402, in the address DB 410, and notifies the registration of the pieces of information to the communication-source address code generation module 430.

The search request reception module 400 receives a search request from the communication-destination address search module 322 of the base station control program 32 (FIG. 8), and sends the address code (A-B-100, 100@D) of the cellular phone 2 of the communication-destination user Y and the address (X', X") of the user X, received from the communication-destination address search module 322, to the search process module 420 and the communication-source address code generation module 430.

The search process module 420 searches the address DB 410 by using the address code (A-B-100, 100@D) of the cellular phone 2 of the user Y received from the search request reception module 400, to obtain the address (Y', Y") of the cellular phone 2 of the communication-destination user Y as a search result, and sends the address (Y', Y") to the search result transmission module 422 and the communication-source address code generation module 430.

The search result transmission module 422 sends the address (Y', Y") of the cellular phone 2 of the communication-destination user Y received from the search process module 420 to the communication-destination address search module 322 of the base station control program 32 (FIG. 8) as the search result.

The communication-source address code generation module 430 searches the address DB 410 when the registration notification is received from the registration process module 404, to determine whether the address (X', X") of the cellular phone 2 of the communication-source user X has been registered in association with the address (Y', Y" shown in part (B) of FIGS. 7A and 7B) of the cellular phone 2 of the communication-destination user Y, received from the search process module 420.

When the address (X', X") of the cellular phone 2 of the communication-source user X has not been registered in the address DB 410 in association with the address (Y', Y") of the cellular phone 2 of the communication-destination user Y, the communication-source address code generation module 430 generates the address code (A-B-200, 200@E) of the cellular phone 2 of the communication-source user X.

Note that the communication-source address code generation module 430 may automatically register the generated address code in the address DB 410.

When the communication-source address code generation module 430 generates the address code (A-B-200, 200@E) of the cellular phone 2 of the communication-source user X, the communication-source address code generation module 430 sends the address code (A-B-200, 200@E) of the cellular phone 2 of the communication-source user X to the communication-source address transmission module 432.

When the information of the cellular phone 2 of the communication-source user X is found in the address DB 410, the communication-source address code generation module 430 further sends the information to the communication-source address transmission module 432.

Hereinafter, processing of the communication-source address code generation module 430 will be further described.

Figure 10:
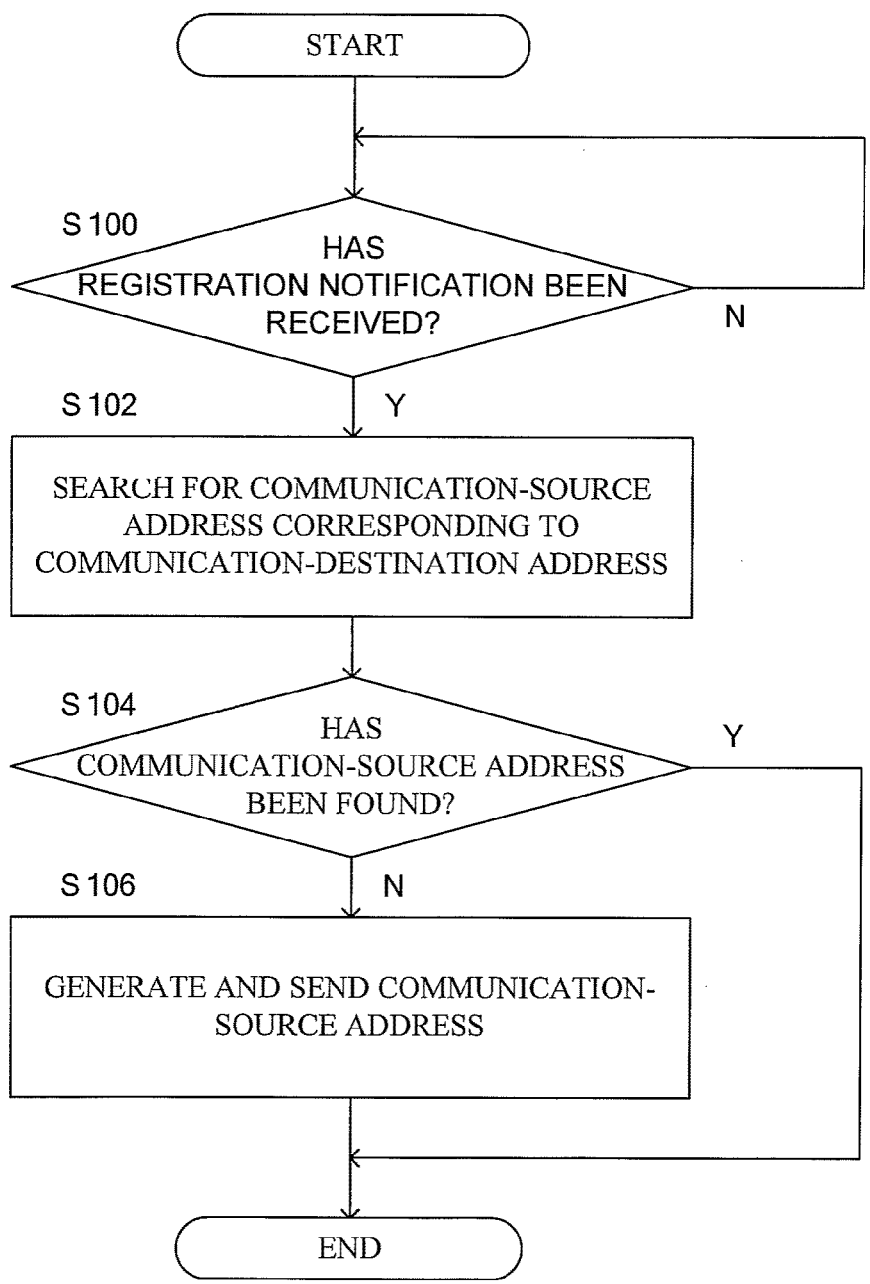
FIG. 10 is a flowchart showing processing (S10) of a communication-source address code generation module shown in FIG. 9.

FIG. 10 is a flowchart showing processing (S10) of the communication-source address code generation module 430 shown in FIG. 9.

As shown in FIG. 10, in Step 100 (S100), the communication-source address code generation module 430 determines whether a notification of registration of information in the address DB 410 has been received from the registration process module 404.

The communication-source address code generation module 430 advances to the process of S102 when the notification of registration has been received. Otherwise, the communication-source address code generation module 430 remains in the process of S100.

In Step 102 (S102), the communication-source address code generation module 430 searches the address DB 410.

In Step 104 (S104), the communication-source address code generation module 430 determines whether the address of the communication-source cellular phone 2 has been registered in the address DB 410 in association with the address of the communication-destination cellular phone 2.

The communication-source address code generation module 430 ends the processing when the address of the communication-source cellular phone 2 has been registered. Otherwise, the communication-source address code generation module 430 advances to the process of S106.

In Step 106 (S106), the communication-source address code generation module 430 generates an address code of the communication-source cellular phone 2 and associates the generated address code and the information thereof with the address of the communication-destination cellular phone 2.

Further, the communication-source address code generation module 430 sends the generated address code and the information thereof to the base station 3 (the incoming process module 328 of the base station control program 32 shown in FIG. 8).

The communication-source address transmission module 432 (FIG. 9) sends the address code (A-B-200, 200@E) of the cellular phone 2 of the communication-source user X and the information thereof (if any), received from the communication-source address code generation module 430, to the incoming process module 328 of the base station control program 32 (FIG. 8) executed in the base station 3.

The address DB 410 stores information registered by the registration process module 404 (and the communication-source address code generation module 430), and provides the information for the processing of the components of the address management program 40.

Operation of Cellular Phone System 1

Hereinafter, overall operations of the cellular phone system 1 will be described.

Figure 11:
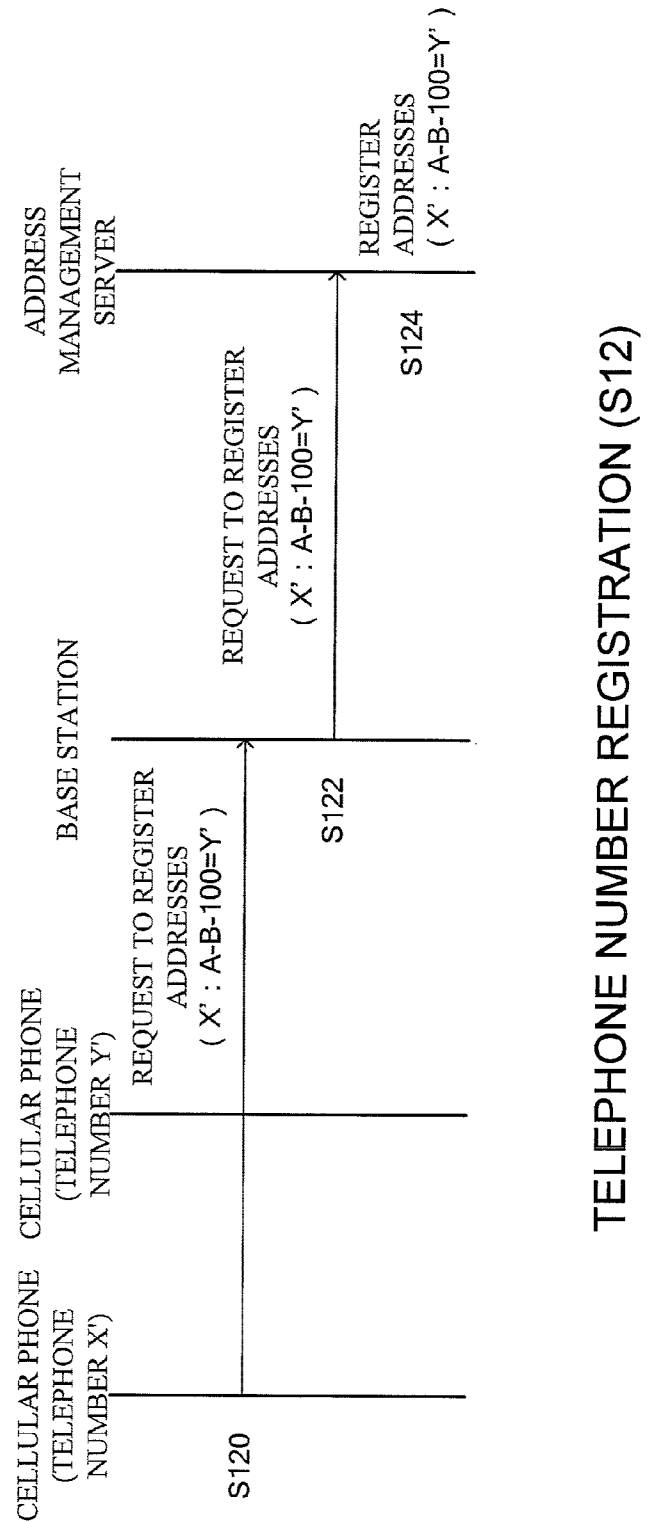
FIG. 11 is a communication sequence diagram showing a first overall operation of the cellular phone system shown in FIG. 1, which is an operation (S12) to register telephone numbers in the address management server from the cellular phone.

FIG. 11 is a communication sequence diagram showing a first overall operation of the cellular phone system 1 shown in FIG. 1, which is an operation (S12) to register telephone numbers in the address management server 4 from the cellular phone 2.

As shown in FIG. 11, in Step 120 (S120), in response to an operation of the user X, the cellular phone 2 of the communication-source user X receives registration of the telephone number code (A-B-100), which has been arbitrarily specified by the user X for the cellular phone 2 of the communication-destination user Y, and information of the cellular phone 2 of the communication-destination user Y, in the address book in association with each other, as shown in part (A) of FIGS. 5A and 5B and part (A) of FIGS. 6A and 6B.

Further, in response to an operation of the user X, the cellular phone 2 of the communication-source user X requests the base station 3 to register the telephone number X' of the cellular phone 2 of the communication-source user X, the actual telephone number Y' of the cellular phone 2 of the communication-destination user Y, and information of the cellular phone 2 of the communication-destination user Y, in the address book in association with one another (X': A-B-100=Y') as shown in part (A) of FIGS. 7A and 7B.

In Step 122 (S122), in response to the address registration request received from the cellular phone 2, the base station 3 requests the address management server 4 to register the telephone number X' of the cellular phone 2 of the communication-source user X, the actual telephone number Y' of the cellular phone 2 of the communication-destination user Y, and the information of the cellular phone 2 of the communication-destination user Y, in the address book used for the cellular phone 2 of the communication-source user X in association with one another (X': A-B-100=Y').

In Step 124 (S124), in response to the registration request received from the base station 3, the address management server 4 registers the telephone number X' of the cellular phone 2 of the communication-source user X, the actual telephone number Y' of the cellular phone 2 of the communication-destination user Y, and the information of the cellular phone 2 of the communication-destination user Y, in association with one another (X': A-B-100=Y').

Figure 12:
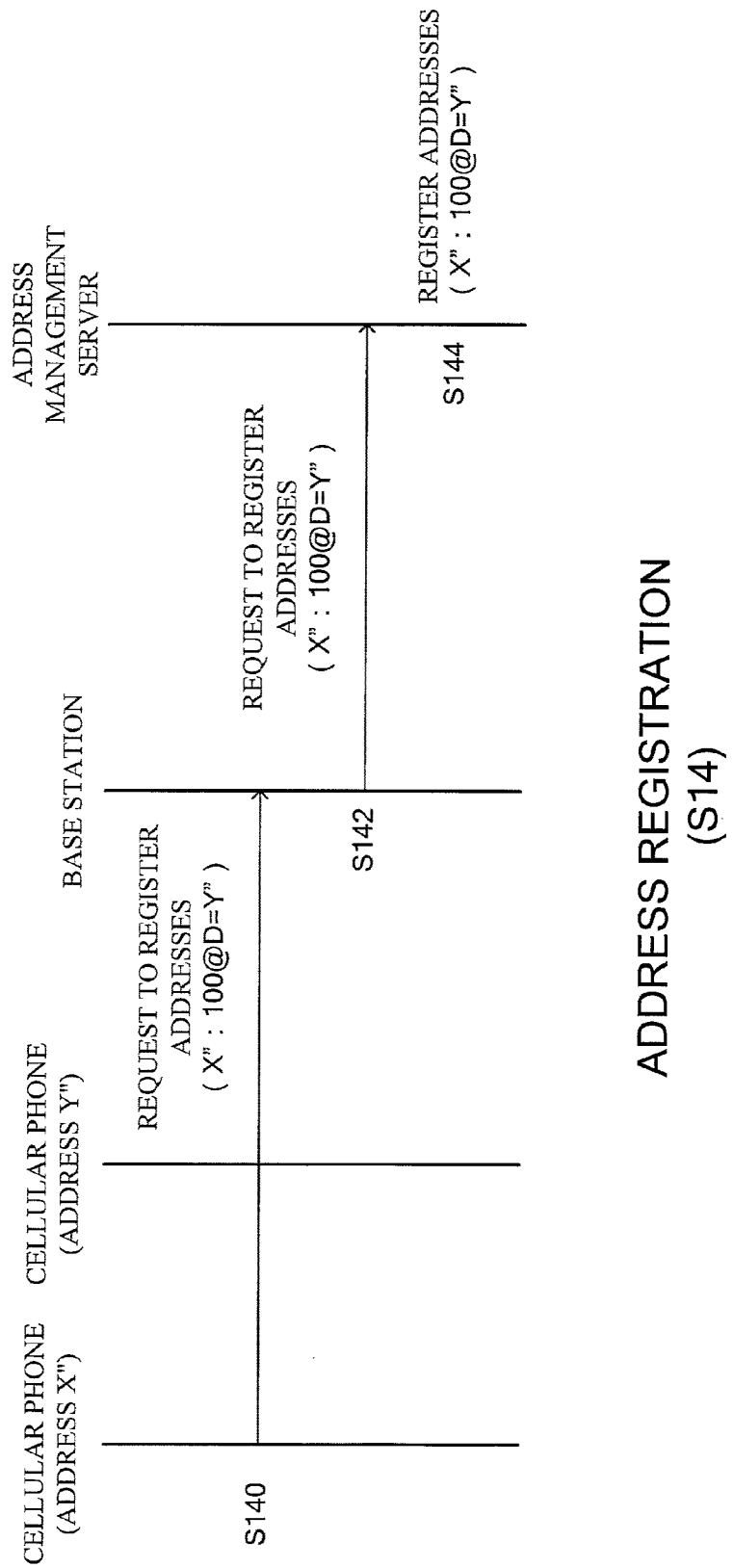
FIG. 12 is a communication sequence diagram showing a second overall operation of the cellular phone system shown in FIG. 1, which is an operation (S14) to register email addresses in the address management server from the cellular phone.

FIG. 12 is a communication sequence diagram showing a second overall operation of the cellular phone system 1 shown in FIG. 1, which is an operation (S14) to register email addresses in the address management server 4 from the cellular phone 2.

As shown in FIG. 12, in Step 140 (S140), in response to an operation of the user X, the cellular phone 2 of the communication-source user X receives registration of the email address code (100@D), which has been arbitrarily specified by the user X for the cellular phone 2 of the communication-destination user Y, and information of the cellular phone 2 of the communication-destination user Y, in the address book in association with each other, as shown in part (B) of FIGS. 5A and 5B and part (B) of FIGS. 6A and 6B.

Further, in response to an operation of the user X, the cellular phone 2 of the communication-source user X requests the base station 3 to register the email address X" of the cellular phone 2 of the communication-source user X, the actual email address Y" of the cellular phone 2 of the communication-destination user Y, and information of the cellular phone 2 of the communication-destination user Y, in the address book in association with one another (X": 100@D=Y") as shown in part (A) of FIGS. 7A and 7B.

In Step 142 (S142), in response to the address registration request received from the cellular phone 2, the base station 3 requests the address management server 4 to register the email address X" of the cellular phone 2 of the communication-source user X, the actual email address Y" of the cellular phone 2 of the communication-destination user Y, and the information of the cellular phone 2 of the communication-destination user Y, in the address book used for the cellular phone 2 of the communication-source user X in association with one another (X": 100@b=Y").

In Step 144 (S144), in response to the registration request received from the base station 3, the address management server 4 registers the email address X" of the cellular phone 2 of the communication-source user X, the actual email address Y" of the cellular phone 2 of the communication-destination user Y, and the information of the cellular phone 2 of the communication-destination user Y, in association with one another (X": 100@D=Y").

Figure 13:
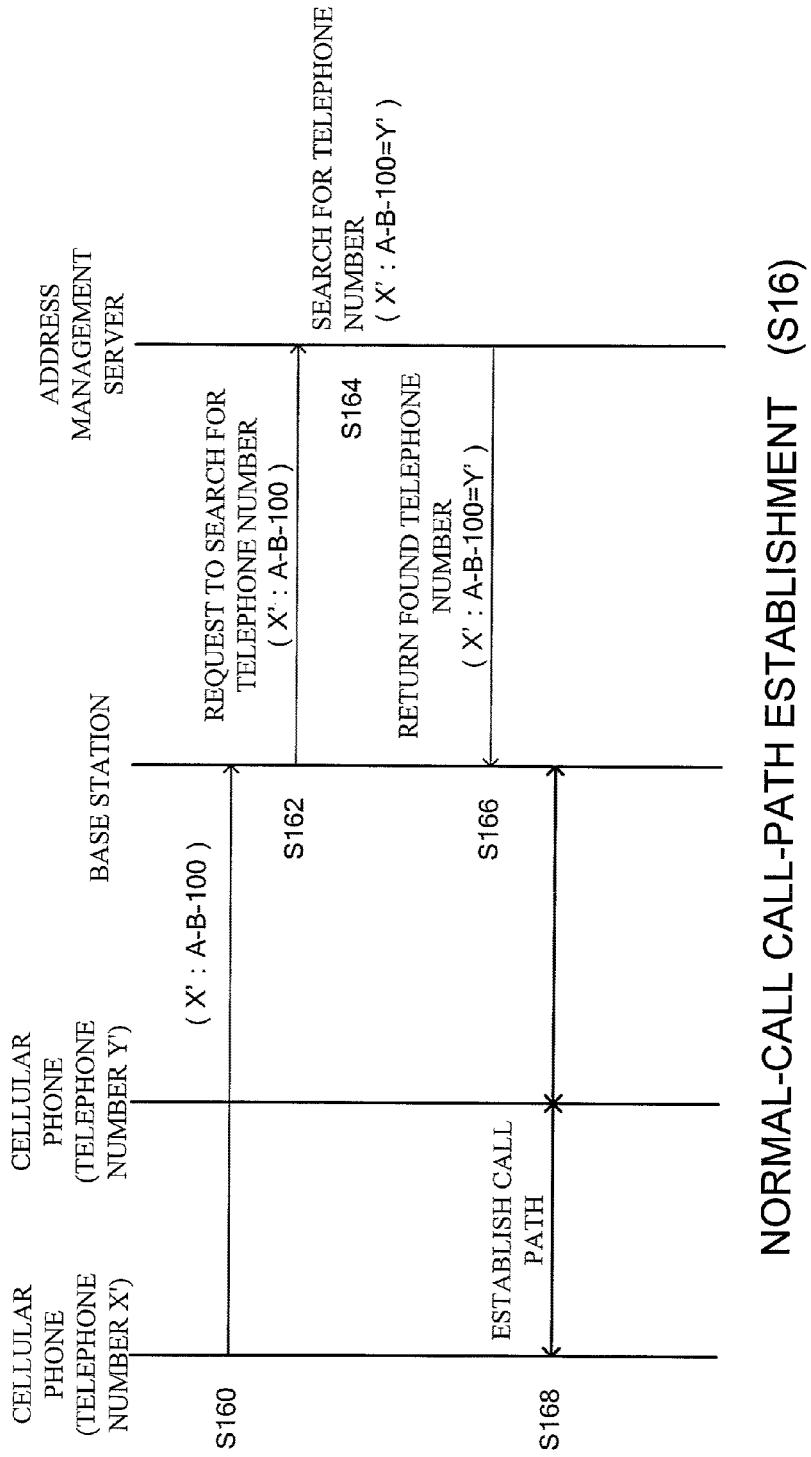
FIG. 13 is a communication sequence diagram showing a third overall operation of the cellular phone system shown in FIG. 1, which is an operation (S16) to make a call from the communication-source cellular phone to the communication-destination cellular phone by using an address book function and perform call communication.

FIG. 13 is a communication sequence diagram showing a third overall operation of the cellular phone system 1 shown in FIG. 1, which is an operation (S16) to make a call from the communication-source cellular phone 2 to the communication-destination cellular phone 2 by using the address book function and perform call communication.

As shown in FIG. 13, in Step 160 (S160), in response to an operation of the user X, the cellular phone 2 of the communication-source user X selects the telephone number code of the cellular phone 2 of the communication-destination user Y by using the address book function.

Further, in response to an operation of the user X, the cellular phone 2 of the communication-source user X sends the actual telephone number X' of the cellular phone 2 of the communication-source user X and the telephone number code of the cellular phone 2 of the communication-destination user Y to the base station 3 to request the base station 3 to make a call to perform call communication with the cellular phone 2 of the communication-destination user Y.

In Step 162 (S162), the base station 3 sends the telephone number code of the cellular phone 2 of the communication-destination user Y and the actual telephone number X' of the cellular phone 2 of the communication-source user X to the address management server 4 to request the address management server 4 to search for the actual telephone number Y' of the cellular phone 2 of the communication-destination user Y.

In Step 164 (S164), in response to the search request received from the base station 3, the address management server 4 searches the address book (part (A) of FIGS. 7A and 7B) used for the cellular phone 2 of the communication-source user X, by using the telephone number code of the cellular phone 2 of the communication-destination user Y and the actual telephone number X' of the cellular phone 2 of the communication-source user X. As a result of the search, the address management server 4 obtains the actual telephone number Y' of the cellular phone 2 of the communication-destination user Y.

At this time, the address management server 4 checks that the actual telephone number of the cellular phone 2 of the communication-source user X has been registered in the address book (part (B) of FIGS. 7A and 7B) used for the cellular phone 2 of the communication-destination user Y, and does not generate the telephone number code of the cellular phone 2 of the communication-source user X.

In Step 166 (S166), the address management server 4 returns the actual telephone number Y' of the cellular phone 2 of the communication-destination user Y, obtained as the search result, to the base station 3.

In Step 168 (S168), the base station 3 establishes a call path between the cellular phone 2 of the communication-source user X and the cellular phone 2 of the communication-destination user Y to allow call communication between them.

Figure 14:
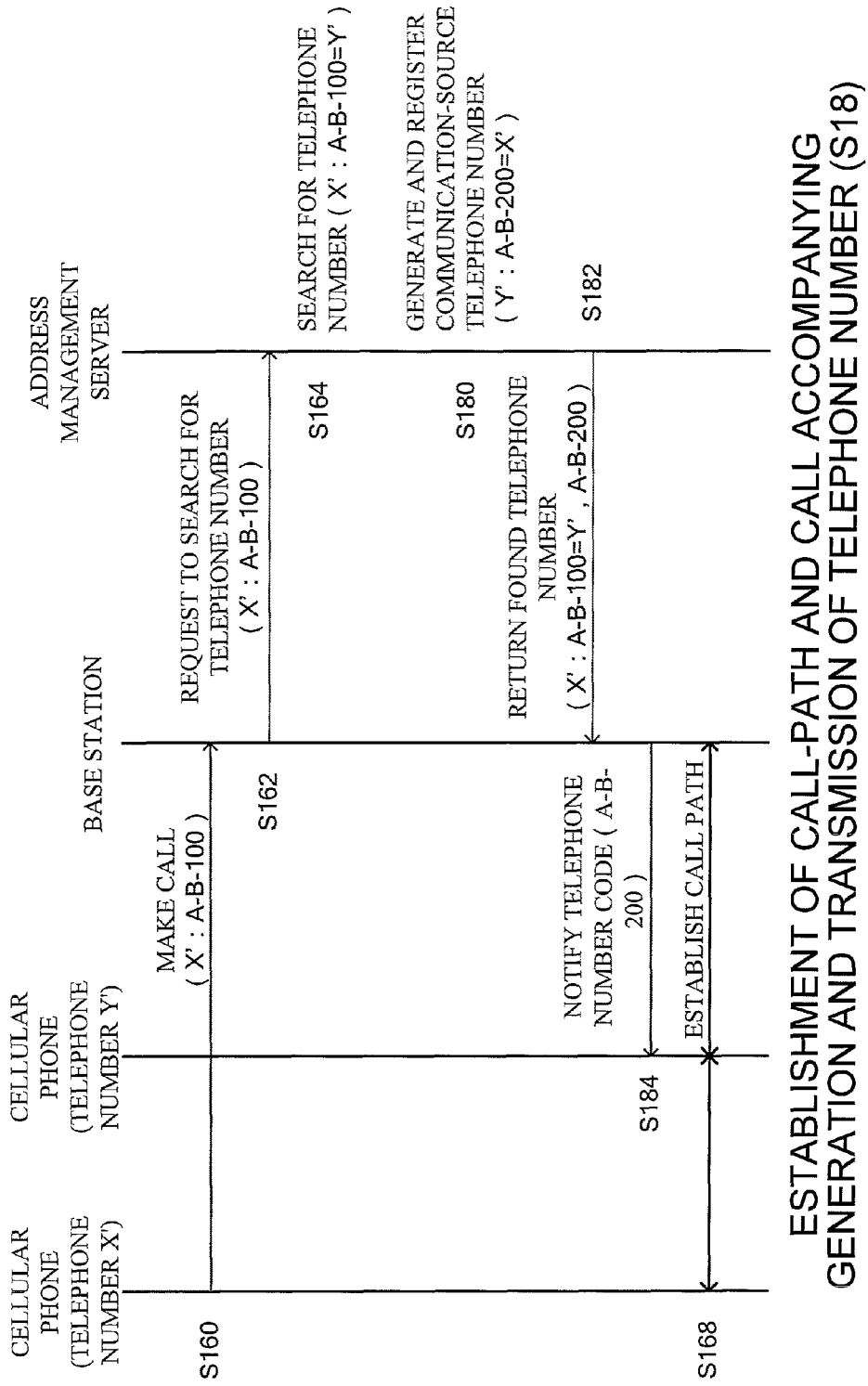
FIG. 14 is a communication sequence diagram showing a fourth overall operation of the cellular phone system shown in FIG. 1, which is an operation (S18) to make a call from the communication-source cellular phone to the communication-destination cellular phone by using the address book function and perform call communication, and further, to generate a telephone number code of the communication-source cellular phone and send the telephone number code to the communication-destination cellular phone.

FIG. 14 is a communication sequence diagram showing a fourth overall operation of the cellular phone system 1 shown in FIG. 1, which is an operation (S18) to make a call from the communication-source cellular phone 2 to the communication-destination cellular phone 2 by using the address book function and perform call communication, and, further, to generate a telephone number code of the communication-source cellular phone 2 and send the telephone number code to the communication-destination cellular phone 2.

As shown in FIG. 14, the processes in S160 to S164 shown in FIG. 13 are performed in the cellular phone system 1.

In Step 180 (S180), the address management server 4 checks that the actual telephone number X' of the cellular phone 2 of the communication-source user X has not been registered in the address book (part (B) of FIGS. 7A and 7B) used for the cellular phone 2 of the communication-destination user Y, and generates a telephone number code of the cellular phone 2 of the communication-source user X (Y': A-B-200=X').

In Step 182 (S182), the address management server 4 returns, to the base station 3, the actual telephone number Y' of the cellular phone 2 of the communication-destination user Y, obtained as the search result, the generated address code of the cellular phone 2 of the communication-source user X, and the actual telephone number of the cellular phone 2 of the communication-source user X (Y': A-B-200=X').

Further, the address management server 4 sends the telephone number code of the cellular phone 2 of the communication-source user X, generated in the process of S180, and information thereof to the base station 3.

In Step 184 (S184), when establishing the call path (S168 of FIG. 13), the base station 3 notifies the telephone number code of the cellular phone 2 of the communication-source user X and the information thereof to the cellular phone 2 of the communication-destination user Y.

Those pieces of information notified to the cellular phone 2 of the communication-destination user Y are registered in the cellular phone 2 of the communication-destination user Y, as shown in part (A) of FIGS. 6A and 6B.

Figure 15:
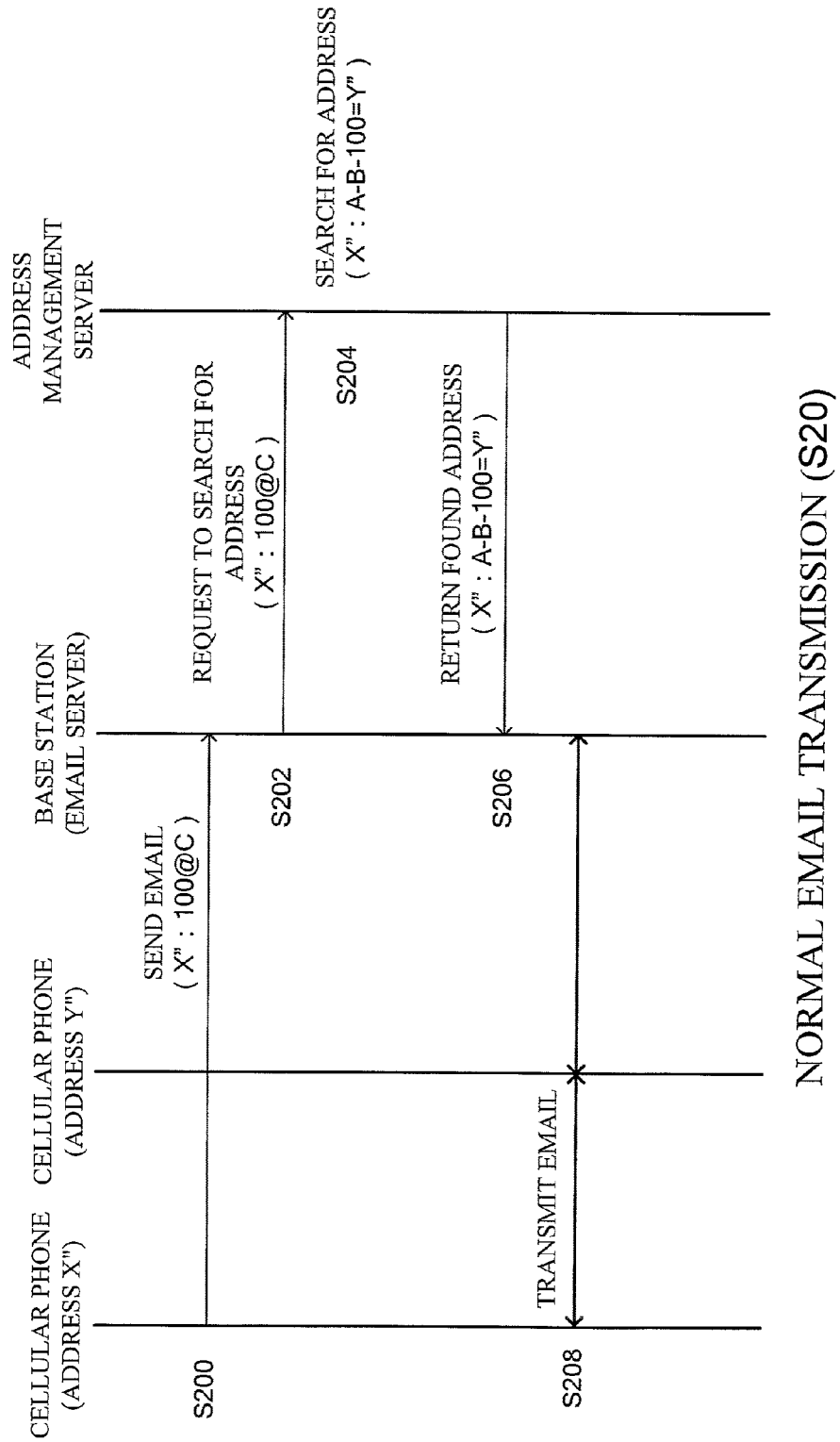
FIG. 15 is a communication sequence diagram showing a fifth overall operation of the cellular phone system shown in FIG. 1, which is an operation (S20) to send email from the communication-source cellular phone to the communication-destination cellular phone by using the address book function and perform email communication.

FIG. 15 is a communication sequence diagram showing a fifth overall operation of the cellular phone system 1 shown in FIG. 1, which is an operation (S20) to send email from the communication-source cellular phone 2 to the communication-destination cellular phone 2 by using the address book function and perform email communication.

As shown in FIG. 15, in Step 200 (S200), in response to an operation of the user X, the cellular phone 2 of the communication-source user X selects the email address code of the cellular phone 2 of the communication-destination user Y by using the address book function. Further, in response to an operation of the user X, the cellular phone 2 of the communication-source user X sends the actual email address X" of the cellular phone 2 of the communication-source user X and the email address code of the cellular phone 2 of the communication-destination user Y to the base station 3 to request the base station 3 to send email to the cellular phone 2 of the communication-destination user Y.

In Step 202 (S202), the base station 3 sends the email address code of the cellular phone 2 of the communication-destination user Y and the actual email address X" of the cellular phone 2 of the communication-source user X to the address management server 4 to request the address management server 4 to search for the actual email address Y" of the cellular phone 2 of the communication-destination user Y.

In Step 204 (S204), in response to the search request received from the base station 3, the address management server 4 searches the address book (part (A) of FIGS. 7A and 7B) used for the cellular phone 2 of the communication-source user X, by using the email address code of the cellular phone 2 of the communication-destination user Y and the actual email address X" of the cellular phone 2 of the communication-source user X. As a result of the search, the address management server 4 obtains the actual email address code Y" of the cellular phone 2 of the communication-destination user Y. At this time, the address management server 4 checks that the actual email address of the cellular phone 2 of the communication-source user X has been registered in the address book (part (B) of FIGS. 7A and 7B) used for the cellular phone 2 of the communication-destination user Y, and does not generate the email address code of the cellular phone 2 of the communication-source user X.

In Step 206 (S206), the address management server 4 returns the actual email address Y" of the cellular phone 2 of the communication-destination user Y, obtained as the search result, to the base station 3.

In Step 208 (S208), the base station 3 sends email between the cellular phone 2 of the communication-source user X and the cellular phone 2 of the communication-destination user Y.

Figure 16:
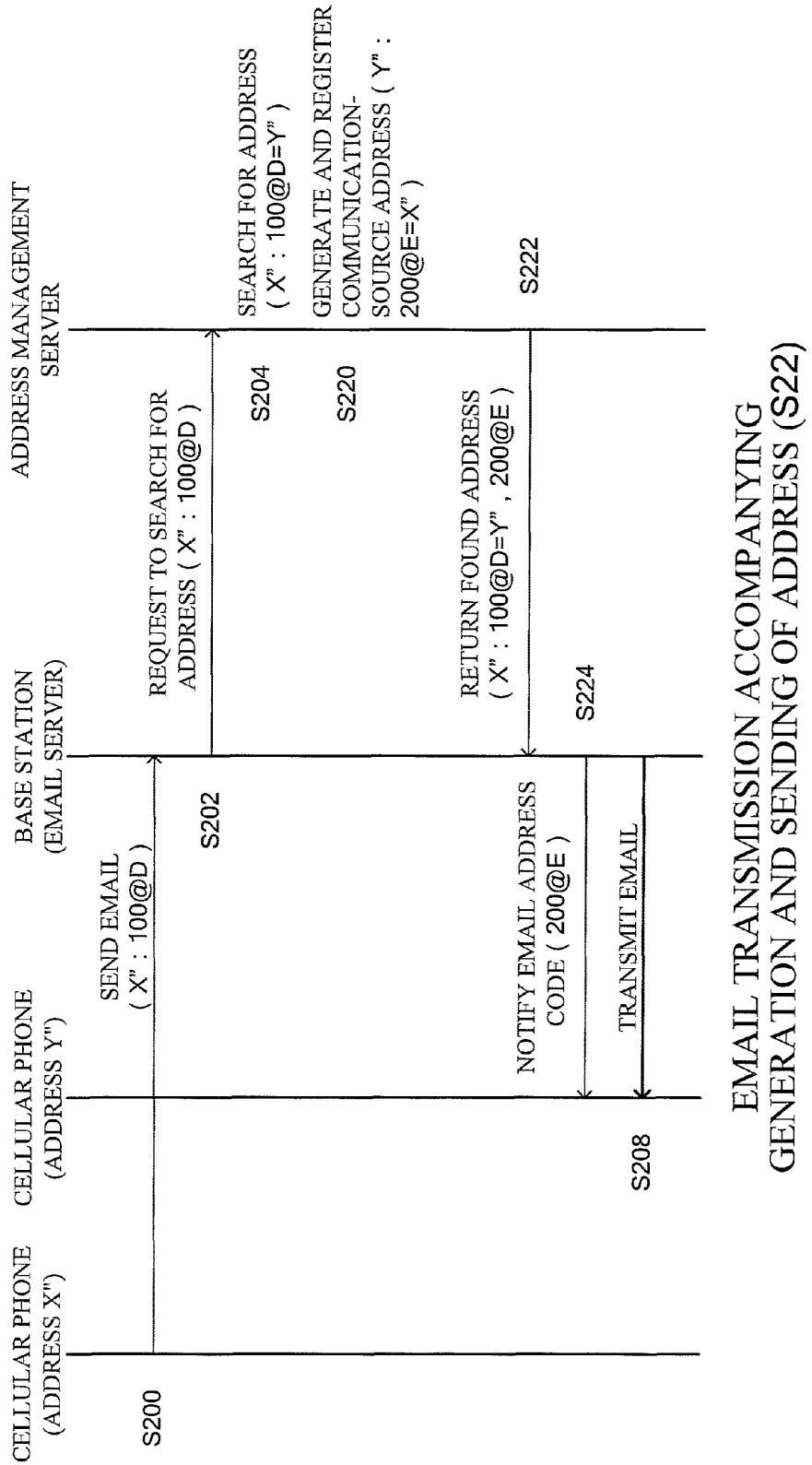
FIG. 16 is a communication sequence diagram showing a sixth overall operation of the cellular phone system shown in FIG. 1, which is an operation (S22) to make a call from the communication-source cellular phone to the communication-destination cellular phone by using the address book function and perform call communication, and further, to generate an email address code of the communication-source cellular phone and send the email address code to the communication-destination cellular phone.

FIG. 16 is a communication sequence diagram showing a sixth overall operation of the cellular phone system 1 shown in FIG. 1, which is an operation (S22) to make a call from the communication-source cellular phone 2 to the communication-destination cellular phone 2 by using the address book function and perform call communication, and, further, to generate an email address code of the communication-source cellular phone 2 and send the email address code to the communication-destination cellular phone 2.

As shown in FIG. 16, the processes in S200 to S204 shown in FIG. 15 are performed in the cellular phone system 1.

In Step 220 (S220), the address management server 4 checks that the actual email address X" of the cellular phone 2 of the communication-source user X has not been registered in the address book (part (B) of FIGS. 7A and 7B) used for the cellular phone 2 of the communication-destination user Y, and generates an address code of the cellular phone 2 of the communication-source user X (Y": 200@E=X").

In Step 222 (S222), the address management server 4 returns, to the base station 3, the actual email address Y" of the cellular phone 2 of the communication-destination user Y, obtained as the search result, the generated address code of the cellular phone 2 of the communication-source user X, and the actual email address of the cellular phone 2 of the communication-source user X (Y": 200@E=X"). Further, the address management server 4 sends the email address code (200@E) of the cellular phone 2 of the communication-source user X, generated in the process of S220, and information thereof to the base station 3.

In Step 224 (S224), when sending email (S208 in FIG. 15), the base station 3 notifies the email address code (200@E) of the cellular phone 2 of the communication-source user X and the information thereof to the cellular phone 2 of the communication-destination user Y. Those pieces of information notified to the cellular phone 2 of the communication-destination user Y are registered in the cellular phone 2 of the communication-destination user Y, as shown in part (B) of FIGS. 6A and 6B.

Application Example of The Address Management Method According to The Present Invention Hereinafter, an application example of the address management method according to the present invention will be described.

Figure 17:
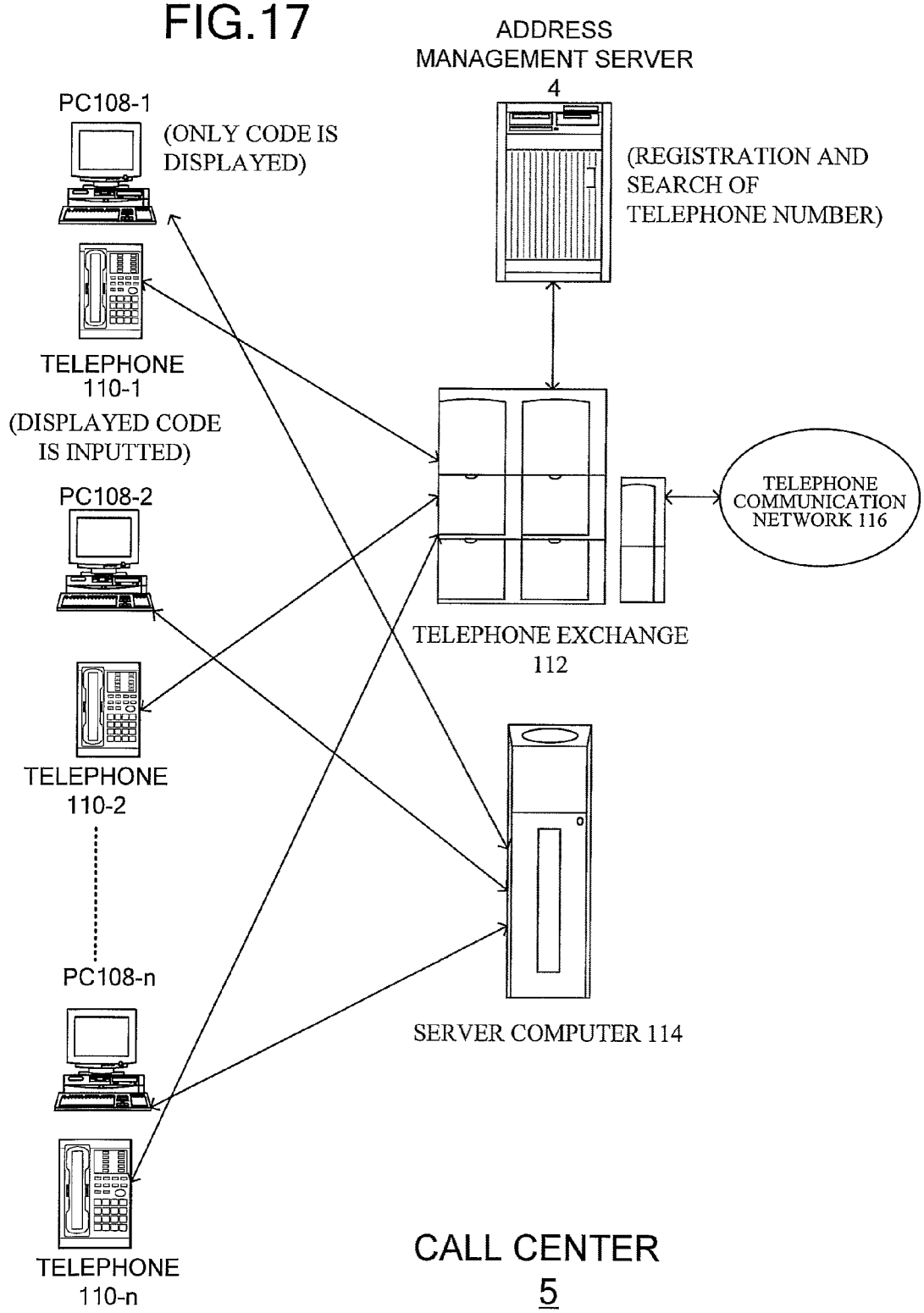
FIG. 17 is a diagram showing a configuration of a call center to which the address management method according to the present invention is applied.

FIG. 17 is a diagram showing a configuration of a call center 5 to which the address management method according to the present invention is applied.

As shown in FIG. 17, the call center 5 includes telephones 110-1 to 110-n, a telephone exchange 112 connected to the telephone 110 and to a telephone communication network 116 via wired communication lines, the address management server 4 connected to the telephone exchange 112, and a server computer 114. The telephone exchange 112 has the same function as the base station 3 (FIG. 1), and connects the telephones 110-1 to 110-n to communication-destination telephones (not shown) connected to the telephone communication network 116 to allow call communications.

The server computer 114 displays, on each of the PCs 108-1 to 108-n, the telephone number code of a communication-destination telephone and information thereof (the name and a mailing address of a user of the communication-destination telephone). The call center 5 is configured such that an operator who sees the telephone number code displayed on the PC 108 by the server computer 114 inputs the displayed telephone number code into the telephone 110 so as to communicate with the communication-destination telephone.

Characteristics of The Address Management Method According to The Present Invention Since the address management method applied to the cellular phone system 1 and to the call center 5, which have been described above, has the following characteristics, personal information (telephone number and email address) can be completely protected.

(1) For example, even when the user of the cellular phone 2 has lost the cellular phone 2, the actual address (telephone number and email address) of a communication-destination is not leaked from the lost cellular phone 2 because the cellular phone 2 only stores an address code of the communication-destination and information thereof.

(2) Since the address management method according to the present invention can be realized by just adding the function of the address management server 4 (FIG. 1) to existing cellular phone communication networks or fixed-telephone communication networks, even when the address management method according to the present invention is introduced to existing cellular phone communication environments or fixed-telephone communication environments, just a slight influence is exerted on such communication environments.

(3) Since a general telephone terminal can be used to register the address code, the actual address, and information in the address management server 4, the address management method according to the present invention can be introduced to the existing cellular phone communication environments or the fixed-telephone communication environments without preparing a special telephone terminal.

(4) Since the address books of the cellular phone 2 and the address management server 4 just need to be managed by the user of the cellular phone 2, an administrator for managing the address books is not required even when the address management method according to the present invention is introduced to the existing cellular phone communication environments or the fixed-telephone communication environments.

(5) For example, if only the address management server 4 has an address book, when the cellular phone 2 is located outside the coverage of the base station 3, the user of the cellular phone 2 cannot refer to the address book. On the other hand, according to the address management method of the present invention, each of the cellular phone 2 and the address management server 4 has an address book. Therefore, even when the cellular phone 2 is located outside the coverage of the base station 3, the user of the cellular phone 2 can refer to its address book.

(6) Since the address management method according to the present invention can be introduced to the existing cellular phone communication environments or the fixed-telephone communication environments without preparing a special telephone terminal as described above, the user of the cellular phone 2 can use, even after the introduction of the method, the cellular phone 2 and the address book through the same operation as before.

(7) When the address management method according to the present invention is applied to the call center 5 (FIG. 17), since personal information (actual telephone number and email address) of a communication-destination does not need to be shown to an operator, the personal information can be firmly prevented from being leaked through the operator.

(8) When the address management method according to the present invention is used together with a center-push method, in which the base station 3 deletes the address book of the cellular phone 2 which has been stolen or lost, the personal information can be more firmly prevented from being leaked.

INDUSTRIAL APPLICABILITY

The present invention is applicable to telephone communications and data communications.

Description of Reference Numerals

1 . . . cellular phone system
100 . . . Internet
102 . . . cellular phone network
104 . . . email server
120 . . . main body
122 . . . CPU
124 . . . memory
126 . . . input and output device 128 ... communication device
130 ... recording device
132 ... recording medium
106 ... LAN/WAN
109 ... PC
2 ... cellular phone
   20 ... telephone control program
   200 ... user interface module (UI module)
   202 ... communication-destination address registration module
   204 ... communication-destination address code registration module
   206 ... address code database (DB)
   208 ... outgoing process module
   210 ... communication process module
   220 ... incoming process module
   222 ... communication-source address code registration module
3 ... base station
   32 ... base station control program
   320 ... communication-destination information reception module
   322 ... communication-destination address search module
   324 ... communication-destination address conversion module
   326 ... outgoing process module
   328 ... incoming process module
   300 ... antenna
   302 ... programmable exchange
   304 ... radio communication device
   306 ... cellular phone network interface (IF)
   308 ... voice mail (VM) device
4 ... address management server
   40 ... address management program
   400 ... search request reception module
   402 ... registration request reception module
   404 ... registration process module
   410 ... address DB
   420 ... search process module
   422 ... search result transmission module
   430 ... communication-source address generation module
   432 ... communication-source address transmission module

What is claimed is:

1. A communication system comprising:
a plurality of communication nodes to each of which a unique address is assigned; and a communication device, wherein:
each of the plurality of communication nodes comprises:
address registration means for registering a communication-destination address of the communication-destination communication node and a communication-destination address code corresponding to the communication-destination address, in the communication device;
first storage means for storing at least the communication-destination address code registered in the communication device; and
communication request means for requesting, when the stored communication-destination address code is selected, the communication device to perform communication with the communication-destination communication node by using the unique address used as a communication-source address of the communication-source communication node, and the selected communication-destination address code; and
the communication device comprises:
second storage means for storing the registered communication-destination address and the registered communication-destination address code in association with an address of the communication-source communication node which has registered the communication-destination address and the communication-destination address code;
search means for searching the second storage means when communication is requested by the communication-source communication node, to obtain the communication-destination address corresponding to the communication-source address and to the communication-destination address code, as a search result;
communication means for allowing the communication between the communication-source communication node and the communication-destination communication node by using the communication-destination address obtained through the search, and notifying the communication-source address code to the communication-destination communication node; and
address code generation means for generating the communication-source address code corresponding to the communication-source address when it is found through the search that the communication-source address code has not been stored in the second storage means in association with the communication-destination address.

2. A communication system according to claim 1, wherein the address code generation means stores the communication-destination address and the generated communication-source address code in association with the communication-source address in the second storage means.

3. A communication system according to claim 1, wherein:
in the communication-source communication node,
the first storage means further stores information of the communication-destination communication node registered in an address management device, in association with the communication-destination address code registered in the address management device; and
the communication request means requests, when at least one of the stored communication-destination address code and the stored information of the communication-destination communication node is selected, the communication device to perform communication with the communication-destination communication node by using the communication-source address, and the selected communication-destination address code or the communication-destination address code corresponding to the selected information of the communication-destination communication node.

4. A communication system according to claim 3, wherein:
in the communication device,
the communication means notifies the generated communication-source address code to the communication-destination communication node, and further notifies information of the communication-source communication node corresponding to the generated communication-source address code to the communication-destination communication node; and
in the communication-destination communication node,
the communication request means requests, when at least one of the notified communication-source address code and the notified information of the communication-source communication node is selected, the communication device to perform communication with the communication-source communication node by using the communication-destination address, and the selected communication-source address code or the communication-source address code corresponding to the selected information of the communication-source communication node.

5. An address management system comprising:
a plurality of communication nodes to each of which a unique address is assigned; a communication device; and an address management device, wherein:
each of the plurality of communication nodes comprises:
   address registration means for registering a communication-destination address of the communication-destination communication node and a communication-destination address code corresponding to the communication-destination address, in the address management device;
   first storage means for storing at least the communication-destination address code registered in the address management device; and
   communication request means for requesting, when the stored communication-destination address code is selected, the communication device to perform communication with the communication-destination communication node by using the unique address used as a communication-source address of the communication-source communication node, and the selected communication-destination address code;
the communication device comprises:
   search request means for requesting, when communication is requested by the communication-source communication node, the address management device to search for a communication-destination address corresponding to a communication-source address and a communication-destination address code which have been used for the communication request; and
   communication means for allowing the communication between the communication-source communication node and the communication-destination communication node by using the communication-destination address returned in response to the search request, and notifying a communication-source address code returned in response to the search request, to the communication-destination communication node; and
the address management device comprises:
   second storage means for storing the registered communication-destination address and the registered communication-destination address code in association with an address of the communication-source communication node which has registered the communication-destination address and the communication-destination address code;
   search means for searching the second storage means in response to the search request from the communication device, and returning the communication-destination address corresponding to the communication-source address and to the communication-destination address code, and the communication-source address code, obtained as search results, to the communication device; and
   address code generation means for generating the communication-source address code corresponding to the communication-source address when it is found through the search that the communication-source address and the communication-source address code have not been stored in the second storage means in association with the communication-destination address.

6. A communication device used in an address management system which comprises the communication device and a plurality of communication nodes to each of which a unique address is assigned,
each of the plurality of communication nodes being configured to:
   register a communication-destination address of the communication-destination communication node and a communication-destination address code corresponding to the communication-destination address, in the communication device;
   store at least the communication-destination address code registered in the communication device; and
   request, when the stored communication-destination address code is selected, the communication device to perform communication with the communication-destination communication node by using the unique address used as a communication-source address of the communication-source communication node, and the selected communication-destination address code,
the communication device comprising:
   storage means for storing the registered communication-destination address and the registered communication-destination address code in association with an address of the communication-source communication node which has registered the communication-destination address and the communication-destination address code;
   search means for searching the storage means when communication is requested by the communication-source communication node, to obtain the communication-destination address corresponding to the communication-source address and to the communication-destination address code, and the communication-source address code, as search results;
   communication means for allowing the communication between the communication-source communication node and the communication-destination communication node by using the communication-destination address obtained through the search, and notifying the communication-source address code returned in response to the communication request, to the communication-destination communication node; and
   address code generation means for generating the communication-source address code corresponding to the communication-source address when it is found through the search that the communication-source address and the communication-source address code have not been stored in the storage means in association with the communication-destination address.

7. An address management device used in an address management system which comprises a plurality of communication nodes to each of which a unique address is assigned, a communication device, and the address management device,
each of the plurality of communication nodes being configured to:
   register a communication-destination address of the communication-destination communication node and a communication-destination address code corresponding to the communication-destination address, in the address management device;

store at least the communication-destination address code registered in the address management device; and request, when the stored communication-destination address code is selected, the communication device to perform communication with the communication-destination communication node by using the unique address used as a communication-source address of the communication-source communication node, and the selected communication-destination address code, the communication device being configured to:

request, when communication is requested by the communication-source communication node, the address management device to search for a communication-destination address corresponding to a communication-source address and a communication-destination address code which have been used for the communication request; and allow the communication between the communication-source communication node and the communication-destination communication node by using the communication-destination address returned in response to the search request, and notifying a communication-source address code returned in response to the search request, to the communication-destination communication node, the address management device comprising:

storage means for storing the registered communication-destination address and the registered communication-destination address code in association with an address of the communication-source communication node which has registered the communication-destination address and the communication-destination address code;

search means for searching the storage means in response to the search request from the communication device, and returning the communication-destination address corresponding to the communication-source address and to the communication-destination address code, and the communication-source address code, obtained as search results, to the communication device; and address code generation means for generating the communication-source address code corresponding to the communication-source address when it is found through the search that the communication-source address and the communication-source address code have not been stored in the storage means in association with the communication-destination address.

8. A communication system comprising: a plurality of communication-source communication nodes to each of which a unique address is assigned; a plurality of communication-destination communication nodes; a communication device; and an address code display device corresponding to each of the plurality of communication-source communication nodes, wherein:

the address code display device displays communication-destination address codes corresponding to communication-destination addresses of the communication-destination communication nodes;

each of the plurality of communication nodes selects, in response to an operation applied to the displayed communication-destination address code, one of the communication-destination address codes and requests the communication device to perform communication with the communication-destination communication node by using the selected communication-destination address code and the unique address used as a communication-source address of the communication-source communication node; and the communication device comprises:

storage means for storing the communication-destination address and the communication-destination address code in association with an address of a communication-source communication node which has registered the communication-destination address and the communication-destination address code;

search means for searching the storage means when communication is requested by the communication-source communication node, to obtain a communication-destination address corresponding to the communication-source address and to the communication-destination address code, and the communication-source address code, as search results; and communication means for allowing the communication between the communication-source communication node and the communication-destination communication node by using the communication-destination address obtained through the search, and notifying the communication-source address code to the communication-destination communication node; and address code generation means for generating the communication-source address code corresponding to the communication-source address when it is found through the search that the communication-source address code has not been stored in the second storage means in association with the communication-destination address.

9. A communication method for a communication device used in an address management system which comprises the communication device and a plurality of communication nodes to each of which a unique address is assigned, wherein each of the plurality of communication nodes being configured to:

register a communication-destination address of the communication-destination communication node and a communication-destination address code corresponding to the communication-destination address, in the communication device;

store at least the communication-destination address code registered in the communication device; and request, when the stored communication-destination address code is selected, the communication device to perform communication with the communication-destination communication node by using the unique address used as a communication-source address of the communication-source communication node, and the selected communication-destination address code, the communication device executes:

a storage step of storing the registered communication-destination address and the registered communication-destination address code in association with an address of the communication-source communication node which has registered the communication-destination address and the communication-destination address code;

a search step of searching the stored communication-destination address, the stored communication-destination address code, and the communication-source address when communication is requested by the communication-source communication node, to obtain the communication-destination address corresponding to the communication-source address and to the communication-destination address code, and the communication-source address code, as search results;

a communication step of allowing the communication between the communication-source communication node and the communication-destination communication node by using the communication-destination address obtained through the search, and notifying the communication-source address code returned in response to the communication request, to the communication-destination communication node; and an address code generation step of generating the communication-source address code corresponding to the communication-source address when it is found that the communication-source address and the communication-source address code have not been stored in association with the communication-destination address.

10. An address management system which includes the communication device and a plurality of communication nodes to each of which a unique address is assigned, wherein each of the plurality of communication nodes being configured to:

register a communication-destination address of the communication-destination communication node and a communication-destination address code corresponding to the communication-destination address, in the communication device;

store at least the communication-destination address code registered in the communication device; and request, when the stored communication-destination address code is selected, the communication device to perform communication with the communication-destination communication node by using the unique address used as a communication-source address of the communication-source communication node, and the selected communication-destination address code, the communication device being configured to:

store the registered communication-destination address and the registered communication-destination address code in association with an address of the communication-source communication node which has registered the communication-destination address and the communication-destination address code;

search the stored communication-destination address, the stored communication-destination address code, and the communication-source address when communication is requested by the communication-source communication node, to obtain the communication-destination address corresponding to the communication-source address and to the communication-destination address code, and the communication-source address code, as search results;

allow the communication between the communication-source communication node and the communication-destination communication node by using the communication-destination address obtained through the search, and notifying the communication-source address code returned in response to the communication request, to the communication-destination communication node; and generate the communication-source address code corresponding to the communication-source address when it is found that the communication-source address and the communication-source address code have not been stored in association with the communication-destination address.

\* \* \* \* \*